United States Patent [19]
Rimkus

[11] Patent Number: 5,841,365
[45] Date of Patent: Nov. 24, 1998

[54] METHOD AND APPARATUS FOR COMMUNICATING WITH A PRODUCT LABEL

[75] Inventor: Joseph Shannon Rimkus, Bothell, Wash.

[73] Assignee: Seattle Silicon Corporation, Bellevue, Wash.

[21] Appl. No.: 195,311

[22] Filed: Feb. 10, 1994

Related U.S. Application Data

[63] Continuation-in-part of Ser. No. 125,518, Sep. 22, 1993, abandoned.

[51] Int. Cl.⁶ .................................................... G09G 3/20
[52] U.S. Cl. ............................. 340/825.35; 340/825.52; 340/825.54
[58] Field of Search ................... 340/825.35, 825.49, 340/825.52, 825.53, 825.54

[56] References Cited

U.S. PATENT DOCUMENTS

| | | |
|---|---|---|
| 3,633,158 | 1/1972 | Heibel . |
| 3,715,725 | 2/1973 | Kievit et al. . |
| 4,002,886 | 1/1977 | Sundelin . |
| 4,087,958 | 5/1978 | Ebihara et al. . |
| 4,091,272 | 5/1978 | Richter et al. . |
| 4,139,149 | 2/1979 | Crepeau et al. . |
| 4,180,204 | 12/1979 | Koenig et al. . |
| 4,231,031 | 10/1980 | Crowther et al. . |
| 4,250,489 | 2/1981 | Dudash et al. ............ 340/825.52 |
| 4,426,662 | 1/1984 | Skerlos et al. . |
| 4,438,432 | 3/1984 | Hurcum . |
| 4,473,824 | 9/1984 | Claytor . |
| 4,500,880 | 2/1985 | Gomersall et al. . |
| 4,514,631 | 4/1985 | Guscott . |
| 4,521,677 | 6/1985 | Sarwin . |
| 4,566,034 | 1/1986 | Harger et al. . |
| 4,603,495 | 8/1986 | Stevens . |
| 4,649,385 | 3/1987 | Aires et al. ............ 340/825.49 X |
| 4,703,451 | 10/1987 | Calabrese . |
| 4,727,475 | 2/1988 | Kiremidjiam . |
| 4,766,295 | 8/1988 | Davis et al. . |
| 4,821,291 | 4/1989 | Stevens et al. ............ 375/37 |
| 4,879,756 | 11/1989 | Stevens et al. . |
| 4,937,586 | 6/1990 | Stevens et al. . |
| 4,939,861 | 7/1990 | Soubliere . |
| 4,962,466 | 10/1990 | Revesz et al. ............ 364/518 |
| 5,019,811 | 5/1991 | Olsson et al. . |
| 5,111,196 | 5/1992 | Hunt . |
| 5,172,314 | 12/1992 | Poland et al. . |

FOREIGN PATENT DOCUMENTS 0396414  11/1990  European Pat. Off. .

Primary Examiner—Brian Zimmerman
Assistant Examiner—Edwin C. Holloway, III
Attorney, Agent, or Firm—Robert M. Storwick

[57] ABSTRACT

A method and apparatus for communicating with a product label. A host computer transfers information to be communicated to one or more product labels to a radio frequency transmitter. The information is transmitted to a transceiver built into the product label. The information can be intended for each of a plurality of product labels, or for a particular one of the product labels. If the particular one of the labels is one which has not communicated recently with the host computer, the information can used to locate the particular label through the use of other product labels.

20 Claims, 19 Drawing Sheets

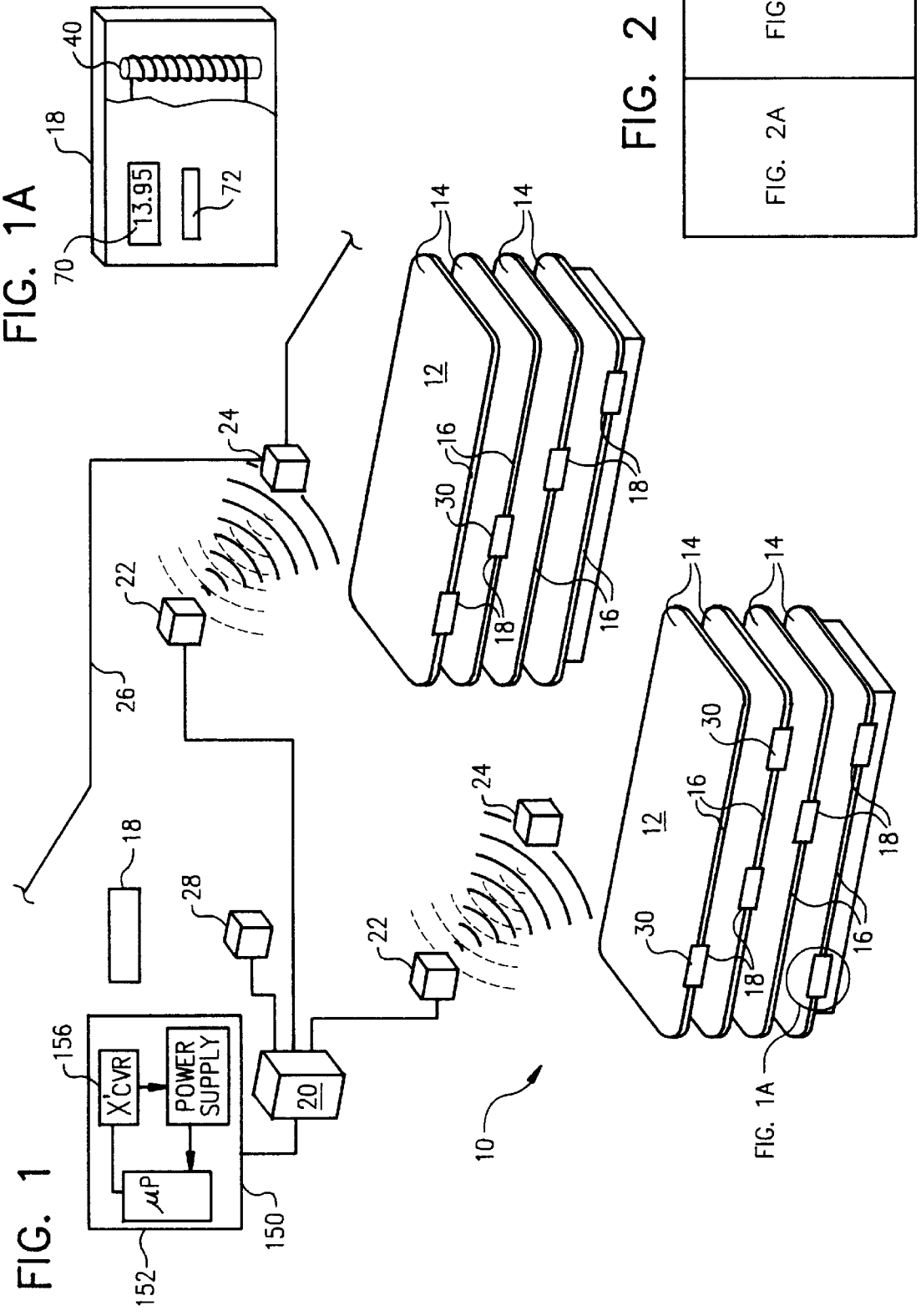

TRANSMITTING DATA FROM BASE TO LABEL

TRANSMITTING AN ACKNOWLEDGMENT FROM LABEL TO BASE

FIG. 6
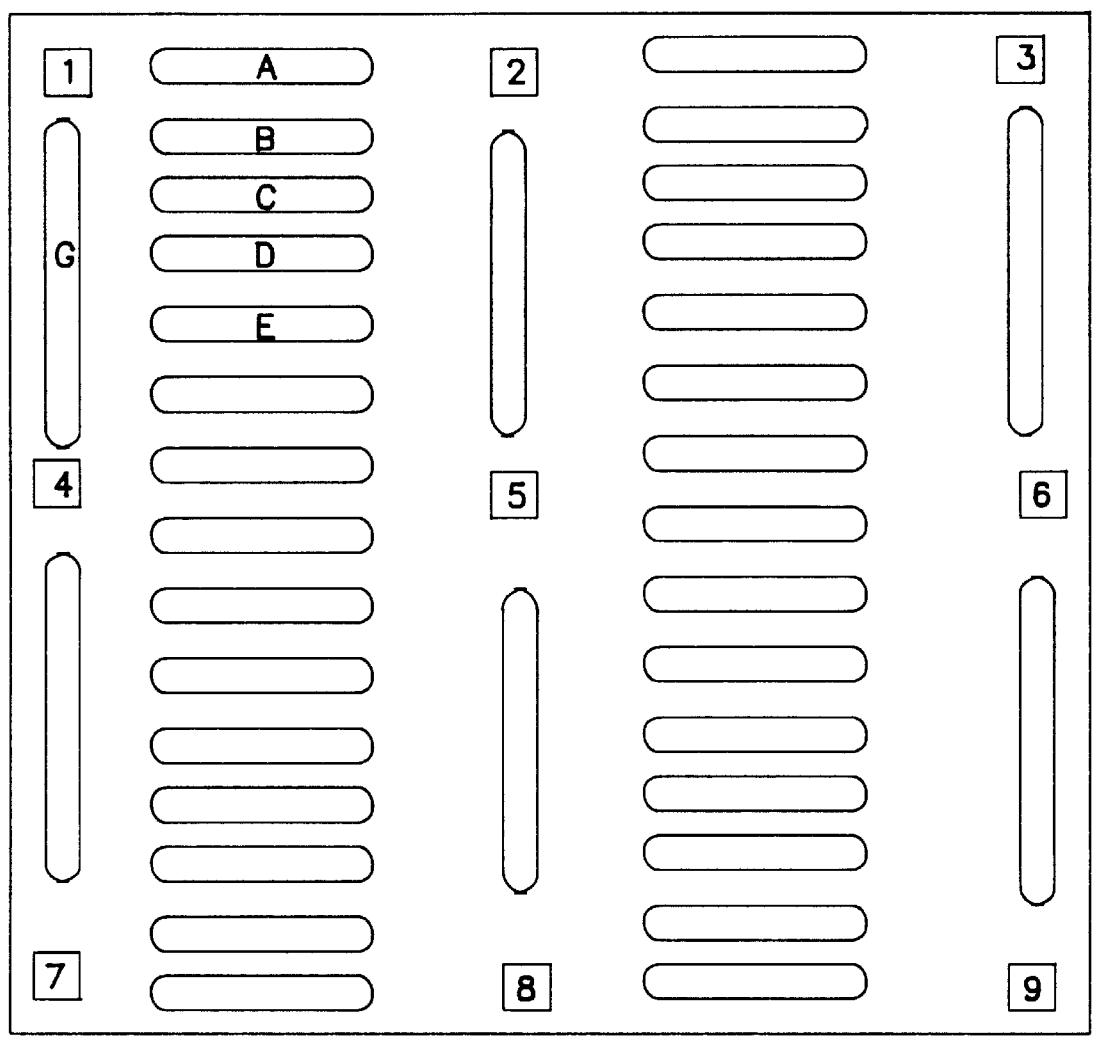
RELAYS 
GONDOLAS 

METHOD AND APPARATUS FOR COMMUNICATING WITH A PRODUCT LABEL

CROSS-REFERENCE TO RELATED APPLICATION

This application is a continuation-in-part of U.S. patent application Ser. No. 08/125,518, "Method and Apparatus for Providing Information Concerning Products, Using Radio Frequency Transmissions," filed Sep. 22, 1993, now abandoned.

FIELD OF THE INVENTION

This invention relates generally to methods and apparatus for providing product labelling, and more particularly, to a method and apparatus for communicating with product labels using radio frequency transmissions.

BACKGROUND OF THE INVENTION

Typically, the sales of products in supermarkets and other commercial stores are dependent upon proper presentation of the products to consumers. Accordingly, it has become a standard for such products to be displayed on shelves so that they may be selected. In addition to the visual appeal of the products, of course, both proper product identification and price are important factors in product sales. Therefore, marketers have been encouraged to market products by precisely identifying each product and its price, so that members of the public can make informed decisions about the product and its price.

Another factor in the presentation of products is product location. Accordingly, marketers have learned to display products two ways. It is important for products to be consistently located within a store (and even within a chain of stores). But it is also important to be able to highlight products with special appeal, such as seasonal items or items that have a special low price. Accordingly, a given product can appear at more than one place within a store. One place is the product's consistent location. The other place is a special location of prominence, which is used when the product is on sale. In addition, marketers have learned to let their product location evolve slowly.

As a result, it can be important for a marketer to have a labelling system that can be easily changed, so that labels will reflect both the product's price as well as its location. For example, a shelf label should be changeable to reflect periodic price changes of a given product. The shelf label should also be changeable so that it can be used to label different products as the array of featured products changes.

Marketers have also learned of the great advantages of product identification systems, such as the Universal Product Code bar code, which facilitate tracking of inventory and render the changing of prices very easy, since it is only necessary to change the price in an office computer to cause the checkout stands to instantaneously begin charging the changed price. Therefore, it is advantageous to have a labelling system that can be used to track the flow of a particular product, in order to facilitate restocking and reordering of the product to allow an adequate inventory of the product to be maintained.

A number of labeling systems have been proposed in the past. In one, labels can be placed along the edges of the shelves where they make contact with electrical power lines and one or more data lines that carry product identification and pricing information to the proper label. One difficulty with such a system is that it requires special shelving units and, due to its exposure, is susceptible to damage—both accidental and intentional. Such a system may also present an electrical shock hazard to the shopping public.

In another system, it has been proposed to power shelving units with electrical power from leads located within the shelves, as discussed above, while allowing the product identification and pricing information to be transmitted to the labels by means of specially located light transmitters. One difficulty with such a system, however, is that it is not always possible to assure that all labels have been properly reprogrammed. The reason is that some label locations may be only marginally exposed to the light transmissions, leaving open the possibility of misprogramming or the failure to reprogram a given label. In addition, light systems are relatively wasteful of power and would not work well if the shelving units were not powered from leads located within the shelves.

Battery-powered labelling systems, of course, suffer from the need to change the batteries periodically to minimize the chance that a label will fail to work properly. Accordingly, it has become important to provide such labelling systems with ways to conserve their electrical power. In addition, frequent replacement of the batteries raises environmental concerns relating to battery disposal.

Accordingly, it would be advantageous to have a labelling system that could economically provide programmable labels which could be reliably programmed without consuming significant amounts of electrical power.

After a labelling system has been placed in a store, a number of eventualities can occur which affect the labelling system's utility. For purposes of maintaining continued customer interest, displays are continually changed in the retail setting, forcing the appropriate labelling to be changed too. In addition, most stores carry seasonal products which are allocated more shelf space when they are in season than when they are not in season. Further, frequently the same product is on display at entirely different locations within a store.

In addition to factors involving product variability, occasional label failure, theft and blockage can affect the performance of a labelling system. In order to be assured that the labelling system is intact, it is helpful to be able to periodically inventory the installed labels to determine their operational status. More specifically, it is useful to be able to distinguish labels which have been moved from one location to another in the store from labels which have either stopped working or been removed from the store premises. If the labels have merely been moved without proper notification to the labelling system, it would be useful for the labelling system to automatically update label locations. On the other hand, if labels have stopped working or been removed from the store, it would be useful to know that it is necessary to repair or replace the labels.

SUMMARY OF THE INVENTION

According to one aspect, the invention is a method for communicating information to a product label having a specific address. The product label is a part of a wireless product label identification system that comprises a host transceiver and a plurality of individually addressed product labels having transceivers, wherein at least some of the individually addressed product labels serve as relays between 1) the host transceiver or one of the individually addressed product labels and 2) another of the individually addressed product labels. The method comprises the steps of a) determining a path through the plurality of individually addressed product labels, from the host transceiver to the product label having the specific address, along which the information can be communicated and b) generating a message representing the path and the information to be communicated. The method further comprises the step of c) transmitting the message along the path to the product label having the specific address.

According to a further aspect, the invention is an apparatus for communicating information to a product label having a specific address. The product label is included in a wireless product label identification system comprising a host transceiver and a plurality of individually addressed product labels having transceivers. At least some of the individually addressed product labels in the wireless product label identification system serve as relays between 1) the host transceiver or one of the individually addressed product labels and 2) another of the individually addressed product labels. The apparatus comprises a first circuit and a second circuit. The first circuit is connected to the host transceiver to determine a path through the plurality of individually addressed product labels, from the host transceiver to the product label having the specific address, along which the information can be communicated. The second circuit is connected to the first circuit to generate a message representing the path and the information to be communicated. The apparatus further comprises a transmitter driver circuit connected to the first circuit to cause the message to be transmitted along the path to the product label having the specific address.

According to another aspect, the invention is for use in a wireless product label identification system comprising a host transceiver and a plurality of product labels having transceivers. The method is for causing those of the product labels that satisfy a predetermined criterion to communicate with the host transmitter. The method comprises the steps of a) transmitting to all of the product labels a message specifying the predetermined criterion, b) causing each of the product labels that receives the message to determine whether it satisfies the criterion, and c) causing those of the product labels that determine that they satisfy the criterion to respond by transmitting a predetermined message back to the host transceiver.

According to a still further aspect, the invention is an apparatus for causing those of a plurality of product labels that satisfy a predetermined criterion to communicate with a host transmitter. The host transceiver and the plurality of product labels having transceivers are parts of a wireless product label identification system. The apparatus comprises a transmitter to transmit to all of the product labels a message specifying the predetermined criterion, a message processing circuit within each of the product labels to cause each of the product labels that receives the message to determine whether the product label satisfies the criterion, and a plurality of transmitter driver circuits, one transmitter driver circuit being contained within each of the product labels, to cause those of the product labels that determine that they satisfy the criterion to respond by transmitting a predetermined message back to the host transceiver.

In yet another aspect, the invention is a method for determining which of product labels has become lost in a last predetermined period of time in a wireless product label identification system comprising a host transceiver and a plurality of individually addressed product labels. The method comprises the steps of a) determining which of the product labels has not communicated with the host transceiver in the last predetermined period of time, b) causing the host transceiver to sequentially transmit a message addressed to each of the product labels that have not communicated with the host transceiver in the last predetermined period of time, the message being structured to cause the product label to respond to the host transceiver with a predetermined reply message if the product label receives the message, and c) determining which of the product labels replies to the host transceiver with the predetermined reply message in response to the message transmitted to the product labels, thereby identifying those addressed product labels which did not reply as having become lost in the last predetermined period of time.

In an even further aspect, the invention is an apparatus for determining which of a plurality of individually addressed products labels has become lost in a last predetermined period of time. The host transceiver and plurality of individually addressed product labels are parts of a wireless product label identification system. The apparatus comprises a first processing circuit to determine which of the product labels has not communicated with the host transceiver in the last predetermined period of time, a transmitter control circuit to cause the host transceiver to sequentially transmit a message addressed to each of the product labels that have not communicated with the host transceiver in the last predetermined period of time, the message being structured to cause the product label to respond to the host transceiver with a predetermined reply message if the product label receives the message, and a second processing circuit to determine which of the product labels replies to the host transceiver with the predetermined reply message in response to the message transmitted to the product labels, thereby identifying those addressed product labels which did not reply as having become lost in the last predetermined period of time.

In an even further aspect, the invention is a method for providing communications between a host computer and any of a plurality of product labels. The method comprises the steps of a) initializing a database in the host computer, the database containing an address for each of the product labels and, for each product label, a sequence of relays between the host computer and the product label, the sequence of relays defining a communication path between the host computer and the product label and b) determining whether to communicate data between the host computer and a particular product label. The method further comprises the steps of c) testing the database to determine whether there has been a lack of communications between the host computer and any of the product labels for more than a predetermined period of time and d) sequentially transmitting a message from the host computer to each of the labels for which there has been a lack of communications with the host computer for more than a predetermined period of time. Further, the method comprises the steps of e), based on the response to the message, specifying whether each of the product labels for which there has been a lack of communications with the host computer for more than the predetermined period of time is quiet or lost and f) determining which of the product labels for which there has been a lack of communications with the host computer for more than the predetermined period of time is quiet and which is lost. Finally, in its broadest aspect, the method comprises the steps of g) sequentially transmitting additional communications to each of the lost labels and h) respecifying any of the product labels from which responses are heard as quiet and the sequence of relays between the host computer and the respecified product label.

In a still further aspect the invention is an apparatus for providing communications between a host computer and any of a plurality of product labels. The apparatus comprises a first circuit in the host computer to initialize a database in the host computer, the database containing an address for each of the product labels and, for each product label, a sequence of relays between the host computer and the product label, the sequence of relays defining a communication path between the host computer and the product label. The apparatus further comprises a second circuit in the host computer to determine whether to communicate data between the host computer and a particular product label and a third circuit in the host computer to test the database to determine whether there has been a lack of communications between the host computer and any of the product labels for more than a predetermined period of time. Still further, the apparatus comprises a transmitter circuit controlled by the host computer to sequentially transmit a message from the host computer to each of the labels for which there has been a lack of communications with the host computer for more than a predetermined period of time and a receiver circuit connected to the host computer to receive any response to the transmitted message. Additionally, the apparatus comprises a fourth circuit in the host computer to specify whether each of the product labels for which there has been a lack of communications with the host computer for more than the predetermined period of time is quiet or lost, a fifth circuit in the host computer to determine which of the product labels for which there has been a lack of communications with the host computer for more than the predetermined period of time is quiet and which is lost. Finally, the apparatus comprises a transmitter circuit controlled by the host computer to sequentially transmit additional communications to each of the lost labels and a sixth circuit in the host computer to respecify any of the product labels from which responses are heard as quiet and the sequence of relays between the host computer and the respecified product label.

BRIEF DESCRIPTION OF THE DRAWINGS

FIG. 1 is a block diagram of an overall system for use in providing information concerning products, using radio frequency transmissions.

FIG. 6 is a schematic diagram of a typical efficient layout of relays in a store with a rectangular floor shape.

FIG. 7 is a table showing the relative distances between relays in the typical efficient layout shown in FIG. 6.

DETAILED DESCRIPTION OF THE PREFERRED EMBODIMENT

Figure 2A:
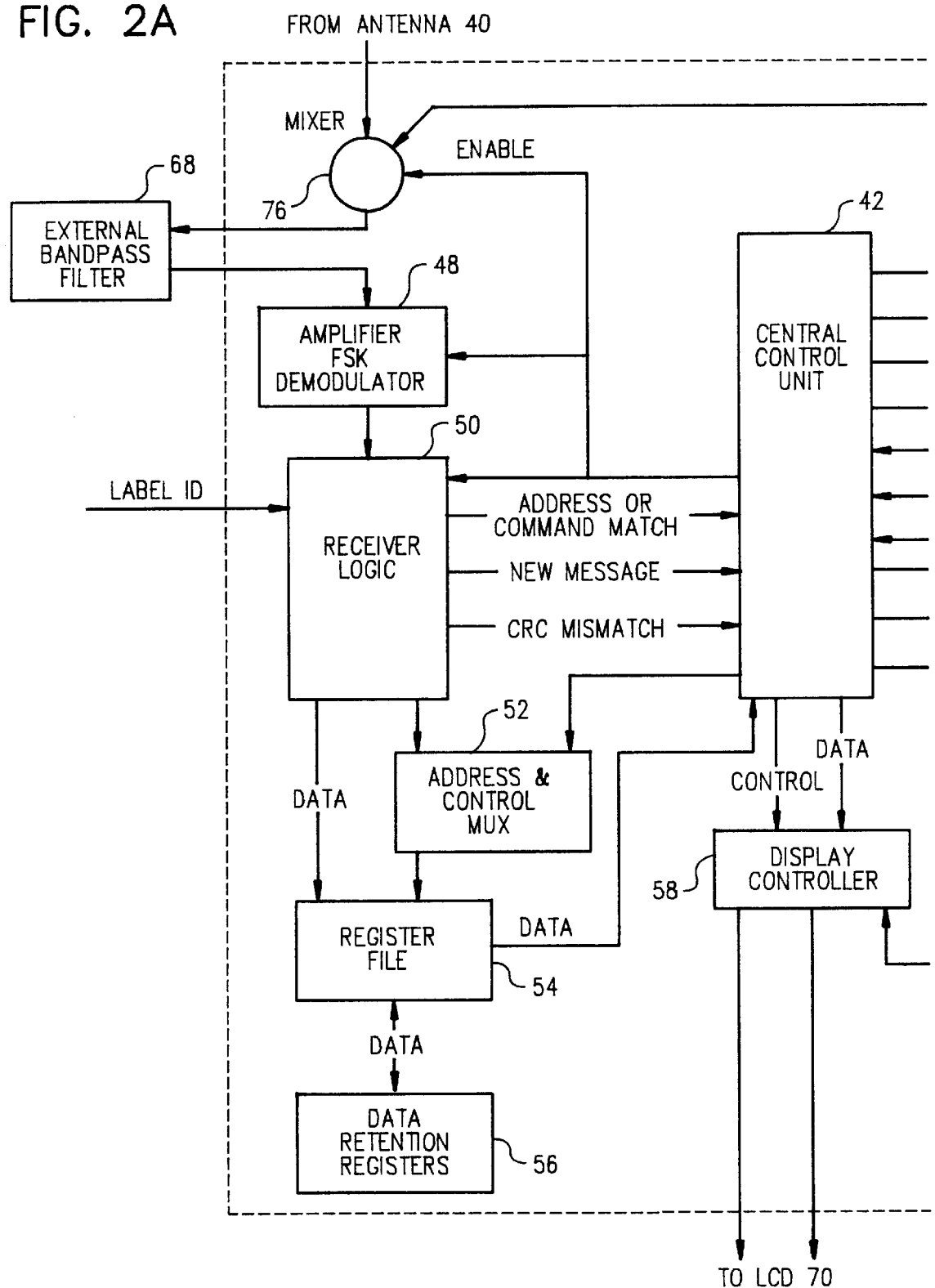
FIG. 2 is a schematic diagram of a product information transceiver for use with the system shown in FIG. 1.

FIG. 1 is a block diagram of an overall labelling system for use in identifying products using radio frequency transmissions. The labeling system 10 includes a number of gondolas 12, each of which includes a number of shelves 14 whose edges 16 are shaped to receive removable programmable labels 18. Each label 18 includes a radio frequency receive/transmit antenna 40, a liquid crystal display (LCD) 70, a photovoltaic cell 72, and various other electronic components (to be described subsequently). The outward appearance of each label 18 is very similar to the labels sold by Electronic Retailing Systems International of Darien, Conn. The LCD 70 and the photovoltaic cell 72 appear on the exterior of the label 18, while the antenna 40 (a ferrite core antenna) and the various electronic components are placed inside the label 18. The programmable labels 18 are designed to be difficult for unauthorized persons to remove from the shelves 14.

Each label 18 has a unique address of 32 bits, which is assigned to the label 18 during the manufacturing process and maintained in a label ID register in the label 18. This assignment can be made by cutting links within a printed circuit board in the label, or by special coding in an ASIC that is incorporated in the label 18. Each label 18 can also contain other information, such as information that is to be displayed on the LCD 70, including the product price, the product's unit price, the number of facings (i.e., the lineal amount of shelf space allocated to the product), the recommended order quantity, the weekly movement of the product and the amount of the product in transit.

The labelling system 10 also includes a host computer 20 that contains inventory, price and product identification information. The host computer 20 is connected to a number of transmitters 22 which receive product price and identification information from the computer 20 and transmit radio frequency signals containing this information to a number of repeaters 24 that are strategically located on the ceiling 26 (or other appropriate surface) of the store. The radio frequency signals can be produced in accordance with standard digital communications techniques as described in "Digital Communications Fundamentals and Applications," by John Proakis (McGraw-Hill) and "Digital Communications," by Bernard Sklar (Prentice-Hall).

The radio frequency signals will activate a label 18 at distances of up to at least 150 feet. Their center frequencies can be chosen at 13, 27 or 49 MHz. A lower center frequency allows the ASIC in the label 18 to use less power, allows for lower risk in the ASIC design and allows for greater coverage due to RF bending and reflections. Potential interference at the center frequency is also a consideration.

The center frequency is established by a synthesizer in the label 18 which is described subsequently. The minimum acceptable number of center frequencies is two; optimally the number of center frequencies is five or more. The label 18 starts operation at a default center frequency but can be reprogrammed to another center frequency by the base system controlled by the host computer 20. The labelling system 10 may also include an exciter 150 which can be used to retrieve an address from a label 18. The exciter 150 can also cause a label 18 to perform a self-test and to provide further information which is stored in the label 18. Finally, the exciter 150 can completely program a label 18. The exciter 150 is connected to the host computer 20, from which it receives its instructions and to which it transmits any information it retrieves from a label 18.

The exciter 150 includes a microprocessor 152, a power supply 154, and a transceiver 156. The microprocessor 152 and the transceiver 156 receive power from the power supply 154. The microprocessor 152 includes a memory in which data from the host computer 20 and data from the label 18 can be stored. The microprocessor 152, under direct command from the host computer 20, or operating from commands in the microprocessor memory that were downloaded from the host computer 20, causes the transceiver 156 to transmit a RF signal to the nearby label 18. The RF signal includes the commands.

The nearby label 18 responds to the RF signal in one of several different ways. For example, if the commands are prompting commands, the label 18 responds by transmitting a return RF signal, containing information, back to the exciter 150. This information includes data stored in the label 18 (for example, the label's address). The transceiver 156 in the exciter 150 receives the return RF signal, and the microprocessor 152 processes the return RF signal and determines the information contained therein. The exciter 150 can then store the information in the memory of the microprocessor 152, or transmit the information back to the host computer 20. The label 18 could also be commanded to perform a self-test, contained in a program stored in the memory of the microprocessor 152, which exercises the electronic components of the label 18, and then to issue a report to the exciter 150 via a return RF signal.

If desired, the exciter 150 can be handheld, which allows its use on installed labels 18. The exciter works by transmitting an RF signal to the label 18, causing the label 18 to emit its address, as if it were acknowledging the receipt of a RF signal containing information. This feature is useful when first programming the label 18, since the label 18 can be given a paper tag which describes a product with which the label 18 is to be associated. The tag includes both a printed description of the product and the universal product code (UPC) bar code for the product. If the bar code is first read by a bar code scanner associated with the host computer 20 and then the label 18 is caused to produce its address, the host computer 20 will associate that label's address with the product, until the label 18 is associated with another product by repeating the same process. In addition to including the product information, the signals include address information which determines which of the labels 18 are to receive which information.

The radio frequency signals are received by the labels 18, where their address information is checked against the receiving label's address. If a label 18 has an appropriate address, it receives the remainder of the information in the radio frequency signals and transmits an acknowledge signal (ACK) which is returned to the host computer 20 along the same sequence of transmitters and repeaters as the radio frequency signals followed, but in the reverse order. This is called a "retransmit on error" system. The receiver 28 can be built into the transmitter 22.

In order to ensure that each label 18 receives the signals that are intended for it, the labels 18 also form a network of secondary repeaters. The labels 18 are equipped to process all signals that they receive and to retransmit all signals that they are not directed to retransmit. In this way, every label 18 can receive its intended signal through multiple paths, thereby greatly reducing the chance that it will not receive the necessary programming information. Each signal includes various fields which hold important information concerning its destination or origin, any instructions it may include, any data it carries, and a cyclic redundancy check (CRC) to verify correct receipt of the same signal that was transmitted. When a signal passes from a transmitter to a label 18 through a series of repeaters, each repeater notes the destination address and awaits the return of the ACK signal. Therefore, when the receiver to which the host computer 20 is attached receives an ACK signal, the signal's address tells the origin of the ACK signal.

The data are transferred to the labels 18 at a rate of 10 kilobits per second, with a minimum bit error rate of approximately $10^{-9}$, if error detection is used. The photovoltaic cell 72 will respond to any illumination in excess of about 20 lux. Security provisions are given to the labelling system 10 by encrypting the transmissions. One suggested standard is provided by IEEE 802.11, with a polynomial of $1+x^{-4}+x^{-7}$.

It is also desirable to make the labels 18 transportable. That is, each label 18 can be removed from one shelf 14 and relocated at any other desired shelf 14. Therefore, it is necessary for each label 18 to have its own transportable electrical energy transducer, the photovoltaic cell 72. The photovoltaic cell 72 is capable of converting the ambient light energy to electrical energy to supply the electrical energy needs for its attached label 18.

The labels 18 are subject to a number of conditions which demand special performance. For example, even if there is a great deal of light within the store where the labels 18 are in use, it is possible for a given label 18 to be shadowed by a consumer who is incidentally standing between the label 18 and its main source of light, thereby causing the label 18 to lose electrical energy. If the blockage condition lasts too long, the affected label 18 adopts a power-down mode in which it first shuts down the included transceiver 34. If the shadowing lasts too long, the affected label 18 next begins to shut down its display 36, and only retains its information stored in its internal memory.

Typically, this latter condition continues during the period when the store lights are turned off if the store is closed during night hours. Under these conditions, the label 18 assumes a low power consumption role which is reversed when the photovoltaic cell 72 on the label 18 again receives adequate amounts of ambient light energy. As the amount of light energy increases, the label 18 first begins to activate its display. As the amount of available light energy continues to increase, the label 18 next powers up its receiver (and transmitter, if so equipped) until it is again fully functional.

Figure 2B:
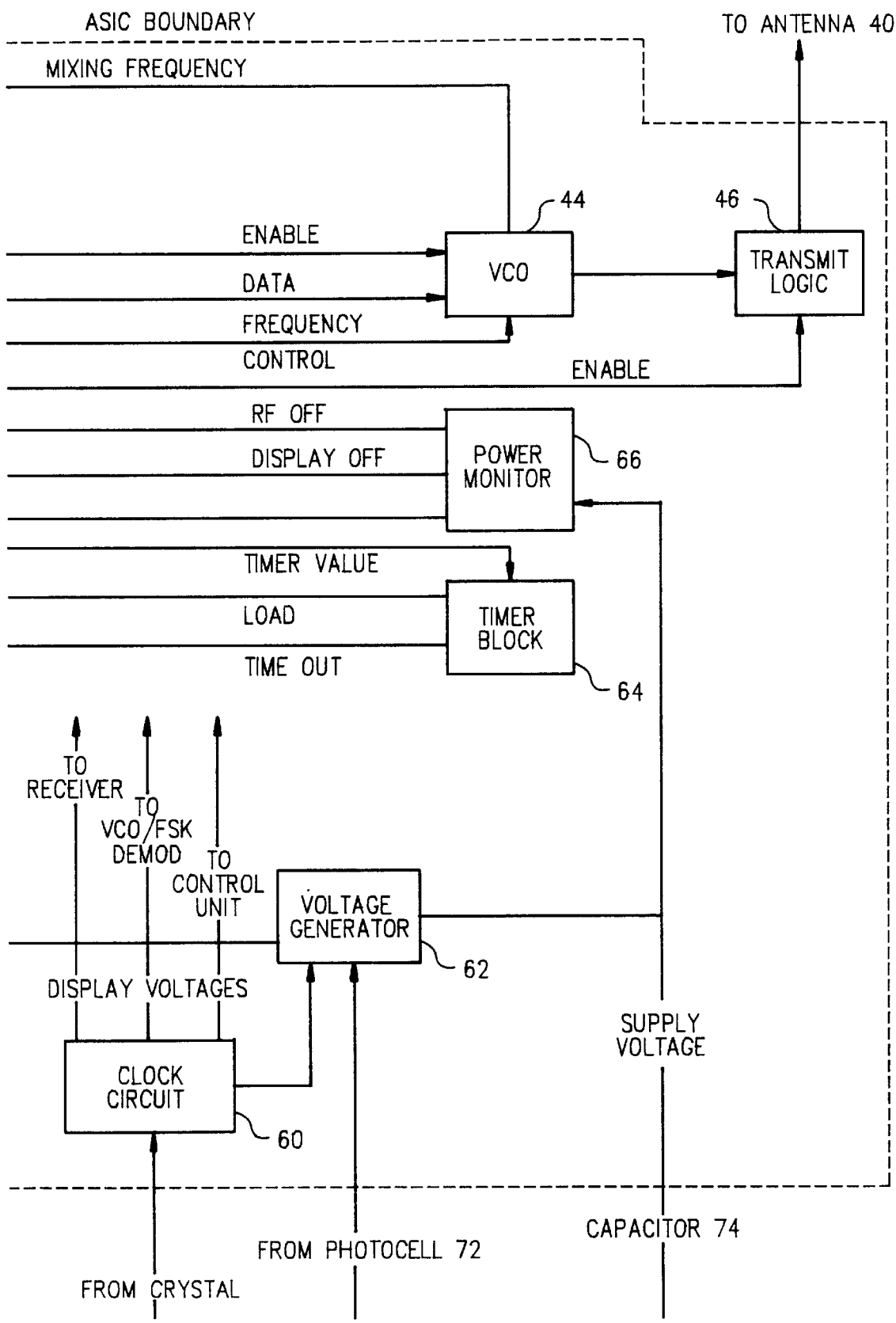

FIG. 2 is a schematic diagram of a product identification transceiver for use with the system shown in FIG. 1. The transceiver 38, which can be incorporated in a single application-specific integrated circuit (ASIC) chip, is attached to an antenna 40 (not shown) which is used for both receiving and transmitting the radio frequency signals containing the information describing the product and the label address, as well as the radio frequency signals containing acknowledgement information. The transceiver 38 includes a central control unit 42, a voltage controlled oscillator (VCO) and frequency synthesizer 44, a transmit logic circuit 46, an amplifier/FSK demodulator 48, a receiver logic circuit 50, an address and control multiplexer 52, and data and data retention registers 54 and 56, respectively.

In addition, the transceiver 38 includes a display controller 58, a clock circuit 60, a voltage generator 62, a timer block 64, and a power monitor 66. The transceiver 38 is connected to an external bandpass filter 68, a label identification register (not shown), a liquid crystal display 70 (not shown), a conventional crystal 71, a photovoltaic cell 72 (not shown), as well as a 50 microfarad capacitor 74 (also not shown). The external bandpass filter 68 is 32 kHz wide and the crystal 71 operates at approximately 32 kHz.

Under control of the central control unit 42, the VCO 44 receives data and frequency signals from the central control unit 42 and modulates them on a radio frequency (RF) carrier signal which it transmits to the transmit logic circuit 46, as well as providing an unmodulated RF signal which is transmitted to a mixer 76. The mixer 76, which is enabled by the central control unit 42, also receives the signal from the antenna 40 to produce an intermediate frequency signal that contains the information originally transmitted. The information is encoded in frequency shift keyed form. The intermediate frequency signal is filtered by the external bandpass filter 68 and then fed to the amplifier FSK demodulator 48, which is enabled under control of the central control unit 42. The output of the amplifier FSK demodulator 48 is transmitted to the receiver logic circuit 50, which is also enabled by the central control unit 42, and receives label identification information concerning the particular transceiver 38. The label identification information is stored in a label identification register (not shown) which is external to the transceiver 38.

The receiver logic circuit 50 produces a number of outputs. Some of these signals are transmitted to the central control unit 42. They are an address or command match signal, a new message signal and a CRC mismatch signal. The address or command match signal is a signal indicating whether the address contained in the information encoded in the radio frequency signal matches the address of the transceiver 38. If the address matches, the central control unit 38 operates to produce other information from the demodulated radio frequency signal. If the signal contains a command match, the central control unit 42 will operate in accordance with the command. The new message signal informs the central control unit 42 that the demodulated radio frequency signal contains a new message. The CRC mismatch signal indicates whether a CRC check has indicated that the information contained in the demodulated radio frequency signal has been properly decoded. If so, the central control unit 42 causes the transmission of an acknowledge (ACK) signal and oversees operation of the transceiver, based on the information contained in the demodulated radio frequency signal.

The receiver logic circuit 50 also produces address and control signals which are transmitted to the address and control multiplexer 52. The address and control multiplexer 52 also receives control signals from the central control unit 42. The control signals are used to provide an address and other control signals to the register file 54. The register file 54 also receives data from the receiver logic circuit 50 and causes the storage of data, which it transmits back to the central control unit 42, and to the proper location in the data retention register 56.

The voltage controlled oscillator 44 also produces an output signal when required by the central control unit 42. The output signal from the voltage controlled oscillator 44 is transmitted to the transmit logic circuit 46, which is enabled by the central control unit 42.

Based on the information received by the central control unit 42, the central control unit 42 controls the operation of the LCD 70 which is built into the label of which the transceiver 38 is a part. The display controller 58 receives both control and data signals from the central control unit 42 and produces proper data and addressing signals to cause the desired product identification and pricing information to be shown on the LCD 70. The external crystal 71 produces a signal which is received by the clock circuit 60, which, in turn, produces clock signals required by the receiver logic 50, the VCO 44, the amplifier FSK demodulator 48, the voltage generator 62, and the control unit 42. The voltage generator 62 receives the voltage produced by the photovoltaic cell 72 and produces therefrom the supply voltage which it transmits to the display controller 58, the power monitor 66, and the capacitor 74. The capacitor 74 stores any excess charge produced by the photovoltaic cell 72, for use if the output of the photovoltaic cell 72 temporarily decreases. The power monitor circuit 66 produces three threshold signals which indicate the voltage level that is currently being produced by the photovoltaic cell 72. If the voltage produced by the photovoltaic cell 72 is currently sufficient to provide power to the radio frequency circuitry, the display and the information storage registers, all three of the threshold signals are on. If, however, the voltage produced by the photovoltaic cell 72 is currently not sufficient to simultaneously provide power to the radio frequency circuitry, the display and the information storage registers, the threshold signal controlling the radio frequency circuitry is turned off, disabling the radio frequency circuitry. If the voltage produced by the photovoltaic cell 72 further degrades, the threshold signal controlling the display is turned off, causing the LCD 70 to blank out. This technique preserves the information which the LCD 70 is intended to display during those periods when there is not enough ambient light to produce a sufficiently large voltage to power all of the circuitry of the label.

The timer block 64 receives a timer value from the central control unit 42 and produces a load signal and a time out signal in response.

Figure 3:
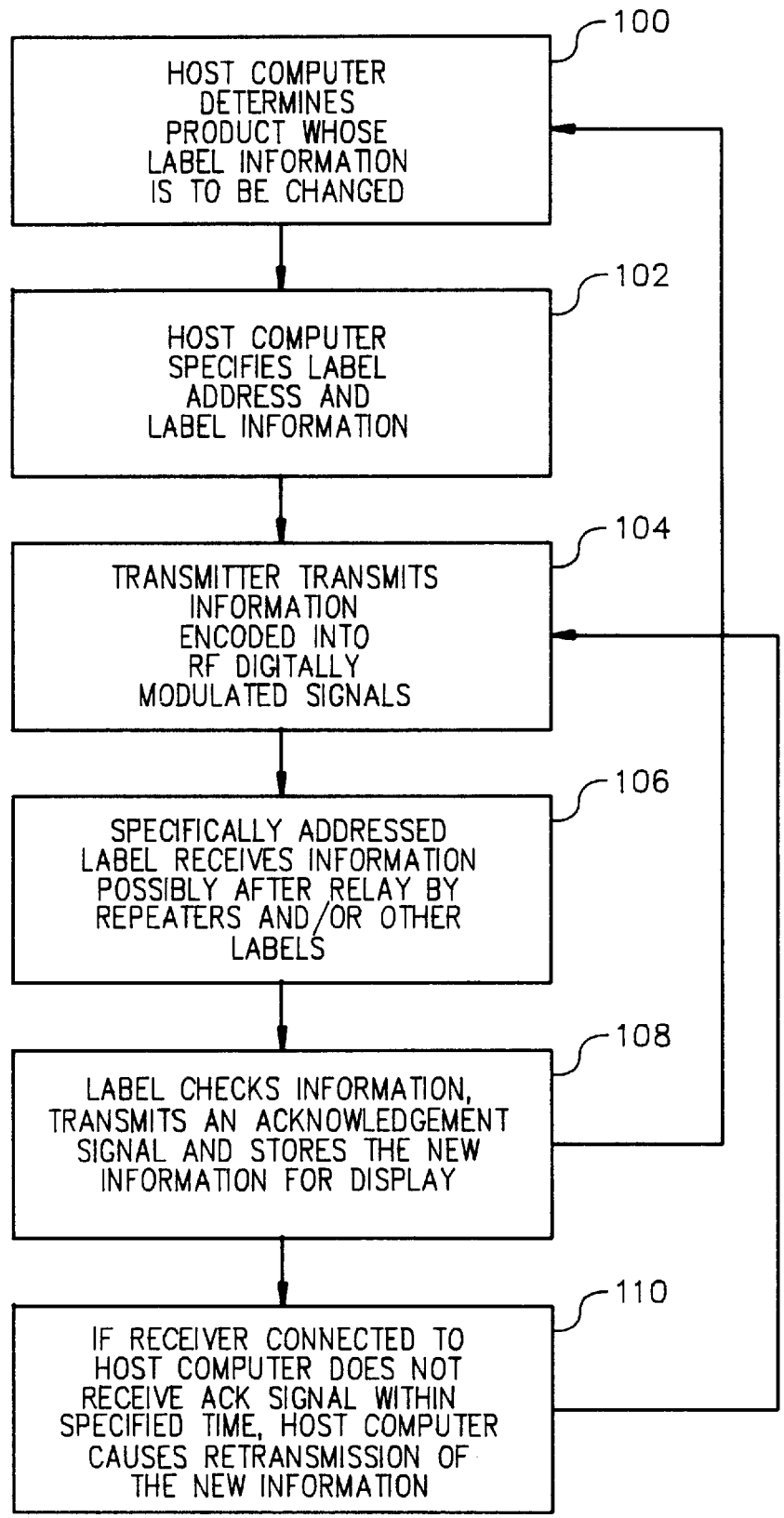
FIG. 3 is a flow chart describing the programming of the inventive system.

FIG. 3 is a flow chart describing the programming of the inventive system. In operation, the host computer 20 of the inventive system 10 determines a product whose label information is to be changed. The host computer 20 can make this determination with the help of human intervention through the use of conventional human/computer interface devices such as a keyboard and a display, or the host computer 20 can make the determination independently of human interaction (box 100). An example of the latter is when a series of price changes are to be made effective at a particular time—say, at midnight of a predetermined day. The host computer 20 then specifies the address(es) of the label(s) that are to have changes in information (box 102). The host computer 20 accomplishes this by reference to a database which it maintains to specify current and future product price and description data.

After the address and information have been specified, the host computer 20 transfers these data to the transmitter(s) 22 which broadcast narrowband RF signals containing the data directly to the addressed label 18, to repeaters 24, and/or to label repeaters 30 (box 104). The addressed label(s) 18 should receive the information within a specifiable period of time (boxes 106 and 108). When the addressed labels(s) 18 verify that they have correctly received the data, they transmit an acknowledgement (ACK) signal back to the host receiver 28, and store the new data, for display (box 108). The host computer 20 then returns to box 100 for further determinations of products whose label information is to be changed.

If the host computer 20 does not receive an acknowledgement of its requested transmission from all of the addressed labels 18 (box 110), the host computer 20 causes the data to be retransmitted to the addressed labels from which it did not receive acknowledgements (box 104).

Figure 4:
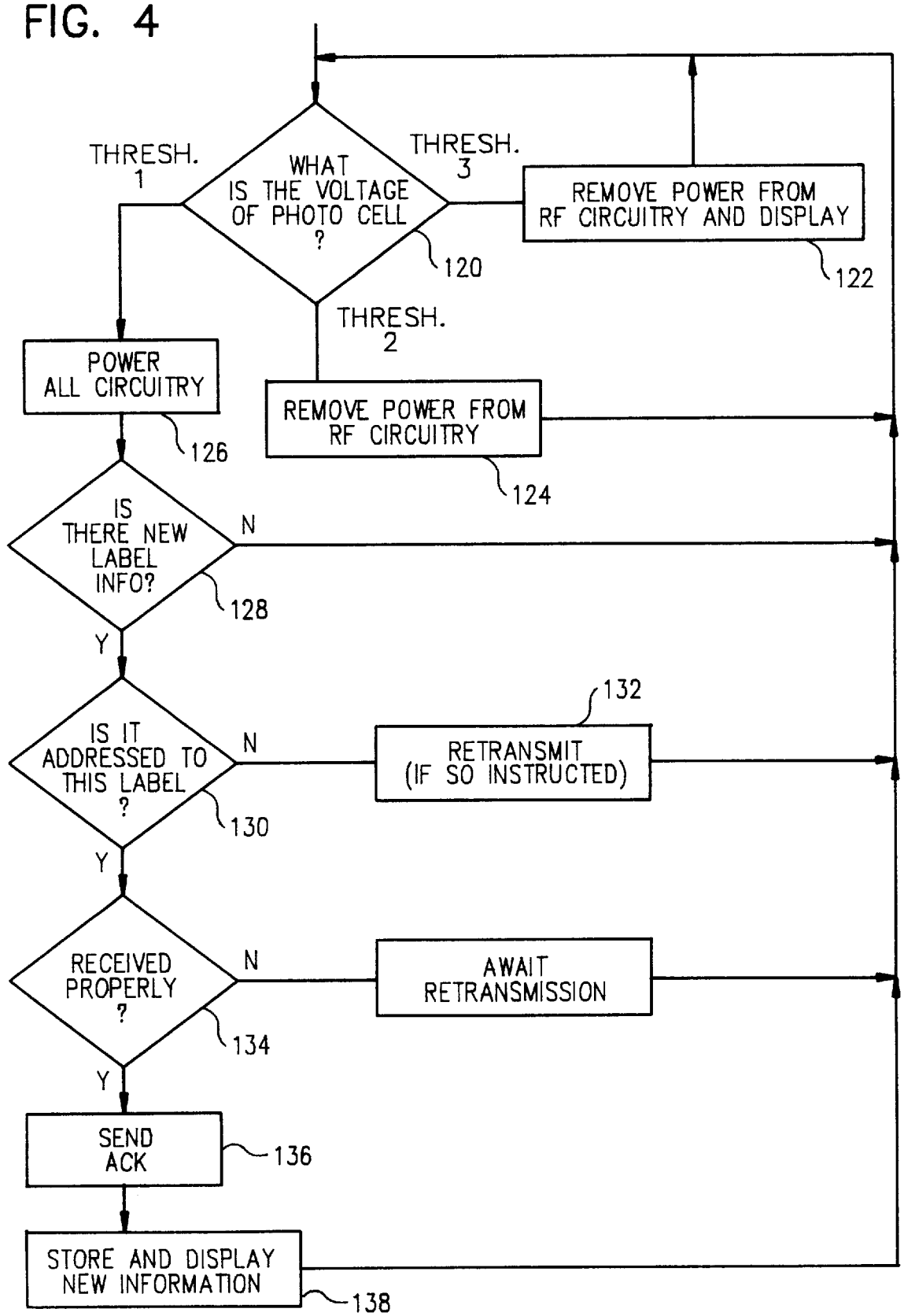
FIG. 4 is a flow chart describing the programming of the labels of the inventive system.

FIG. 4 is a flow chart describing the programming of the labels of the inventive system. The central control unit 42 of the specific label 18 continually checks the voltage output of its photovoltaic cell 72 and compares the voltage output to three thresholds (box 120). If the output voltage is less than the lowest threshold (threshold 3), the central control unit 42 removes electrical power from the radio frequency circuitry and display circuitry of the label 18, essentially only maintaining the information in storage registers (box 122). This represents the lowest power consumption condition of the label 18 (other than completely off, which condition would require retransmission of the information to the label 18). This is the condition that would occur daily after the store is closed and most of the lights are turned off, until they are turned on again. After ensuring that the electronic circuitry of the label 18 is in its lowest power-consumption mode, the label 18 returns to box 120.

If the voltage of the photovoltaic cell 72 is at a higher level (between threshold 1 and a higher threshold 2), the label 18 removes power from the radio frequency circuitry (box 124). This allows the label 18 to continue to display the information with which it has been programmed, but does not permit the label 18 to receive any new information from the host computer 20. After ensuring that the radio frequency circuitry is turned off, while the display circuitry is turned on, the label 18 returns to box 120.

If the voltage from the photovoltaic cell 72 is at a higher level (exceeding threshold 2), the label 18 provides electrical power to all of its circuitry, including the radio frequency circuitry (box 126). The label 18 then checks to determine whether there is any new label information being transmitted or repeated (box 128). If not, the label 18 returns to box 120. Otherwise, the label 18 determines whether the information is addressed to the particular label 18 (box 130). If it is not, the label 18 retransmits the information, if the label 18 is so instructed (box 132) and returns to box 120. Otherwise, the label 18 checks to determine whether the information that is directed to it has been received properly (box 134). If not, the label 18 enters a mode in which it waits for retransmission of the information and returns to box 120.

While the label 18 is waiting for transmission of the information, it can power down if its source of electrical power is at all marginal. In one embodiment, the label 18 can conserve electrical power by turning off its receiver, which it reactivates occasionally to determine whether a message directed toward the label 18 has been sent. Alternatively, in the wait mode, the label 18 can receive instructions causing it to shut down, can respond to an internal clock. Otherwise, the label 18 sends an acknowledgment signal (box 136), stores and displays the new information (box 138), and returns to box 120.

Figure 5A:
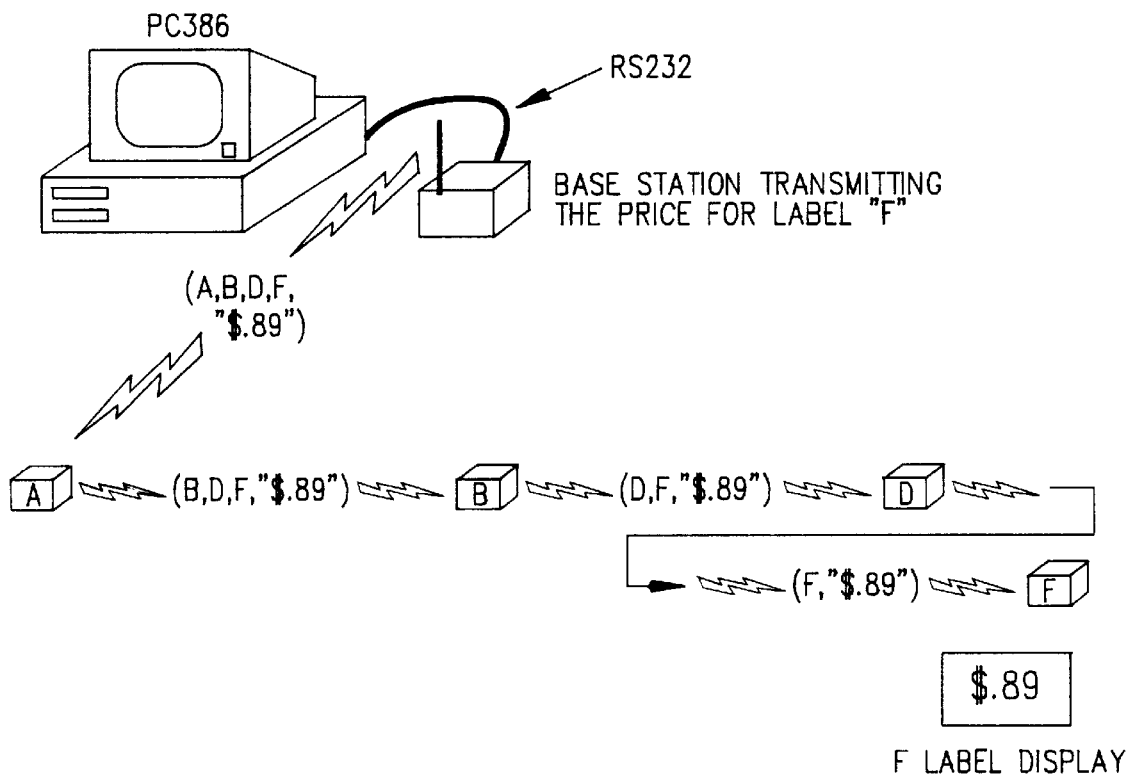
FIG. 5A is a schematic diagram of the transmission of a message from the host computer to a label via relays.

FIG. 5A is a schematic diagram of the transmission of a message from the host computer to a label via relays. The host computer 20 generates a message 150 that is to be transmitted from the transmitter 22 to the label 18 along a path. The transmitter 22 communicates with the host computer 20 through a cable 152 which transfers information according to the RS 232 standard. The message 150 includes information to be transmitted (e.g., "$0.89") and a series of addresses (e.g., "A,B,D,F"). The series of addresses define the path between the host computer 20 and the label 18.

The message 150 is first transmitted by the transmitter 22. It is possibly received by many different labels 18 and relays 24, but it is collected only by the relay 24A which has an address of A, the first component in the message 150. The relay 24A then processes the message 150 by removing the first component ("A") and retransmits the processed message 150'. The processed message 1501 still contains the information ("$0.89") which is preceded by the sequence of addresses ("B,D,F" ). The processed message 150" is possibly received by many different labels 18 and relays 24, but it is collected only by the relay 24B which has the address B. The relay 24B the processes the message 150 by removing the first remaining component ("B") and retransmits the processed message 150". This process is continued again by the relay 24D which retransmits the processed message 150'". The message 150'" is possibly received by many different labels 18 and relays 24, but only the label 18F collects the message for final processing, since the last remaining portion of the address string in the message 150'" matches only the address of the label 18F. In this case, the label 18F processes the information in the message 150'" and updates the price which it has stored for the product it labels.

Figure 5B:
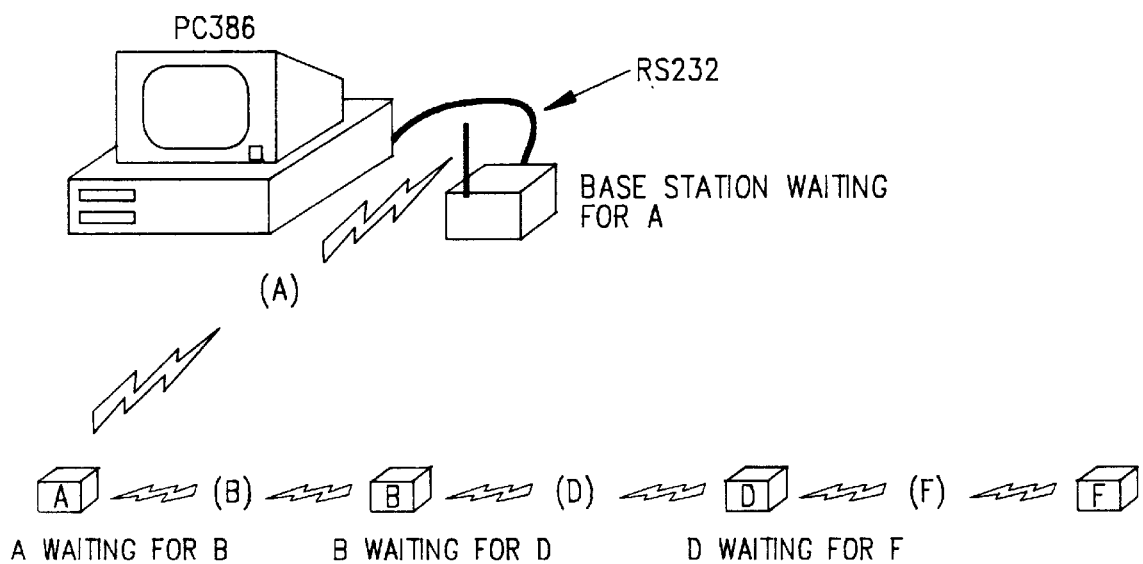
FIG. 5B is a schematic diagram of the transmission of an acknowledgement message from a label to the host computer via relays.

FIG. 5B is a schematic diagram of the transmission of an acknowledgement message from a label to the host computer via relays. The label 18F transmits an acknowledgement signal containing the address (D) of the relay 24D from which it received the message. Only the relay 24D collects the acknowledgement signal, since it is the only relay 24 or label 18 with the proper address. The relay 24D, in turn, transmits an acknowledgement signal containing the address (B) of the relay 24B from which it received the message. Only the relay 24B collects the acknowledgement signal, since it is the only relay 24 or label 18 with the proper address. The relay 24B, in turn, transmits an acknowledgement signal containing the address (A) of the relay 24A from which it received the message. Only the relay 24A collects the acknowledgement signal, since it is the only relay 24 or label 18 with the proper address. The relay 24A, in turn, retransmits an acknowledgement signal to the base station 22, which is waiting for an acknowledgement signal from the relay 24A. The base station 22, in turn, informs the host computer 20 by means of an "acknowledgement received" signal through the cable 152. The host computer 20 is then able to send another message.

FIG. 6 is a schematic diagram of a typical efficient layout of relays in a store with a rectangular floor shape. In this case, the floor shape is that of a square 100 feet on a side. While it is possible to use the general message transmission and acknowledgment procedure outlined in FIGS. 5A and 5B with any path that starts at a transmitter 22 and ends at the desired label 18, improvements can be made by recognizing that some paths are more direct or otherwise suitable than other paths. As shown in FIG. 6, the relays with numeric labels "1", "2", . . . , "9" are strategically placed to make it easy to communicate with the labels 18 on the gondolas 12. Some of the gondolas 12 are given alphabetical labels "A", "B", . . . , "G", for illustrative purposes. To illustrate the point, it would clearly be more efficient to transmit a message intended for a label 18 on gondola 12 having the label "D" by using the relay 22 with the numeric label "2" than by using the relay 22 having the numeric label "8". To accomplish this, the host computer 20 can contain a table showing the relative distances between relays 18 and between relays 18 and gondolas 12.

FIG. 7 is a table 154 showing the relative distances between relays in the typical efficient layout shown in FIG. 6. A first portion 156 of the table 154 shows the relative distances between each possible pair of relays. For example, the distance between the relay 22 with the numeric label "1" and the relay 22 with the numeric label "3" is 100 feet, while the distance between the relay 22 with the numeric label "1" and the relay 22 with the numeric label "9" is 141 feet. A second portion 158 of the table 154 shows the relative distances between relays 18 and gondolas 12. For example, a relay 18 having an alphabetical label "A" is closer to each of the gondolas having the alphabetical labels "A" through "F" than is the relay 18 having the alphabetical label "B". (Portion 158 of the table 154 is shown for illustrative purposes only. The relays and gondolas do not correspond to relays or gondolas shown in FIG. 6.) This information can be used by those skilled in the art to select efficient paths between transmitters 22 and labels 18, possibly via repeaters 22. By preinitializing this distance information in a central database in the host computer 20, it will be unnecessary to make exhaustive searches to initialize the database or to find lost labels.

Figure 8:
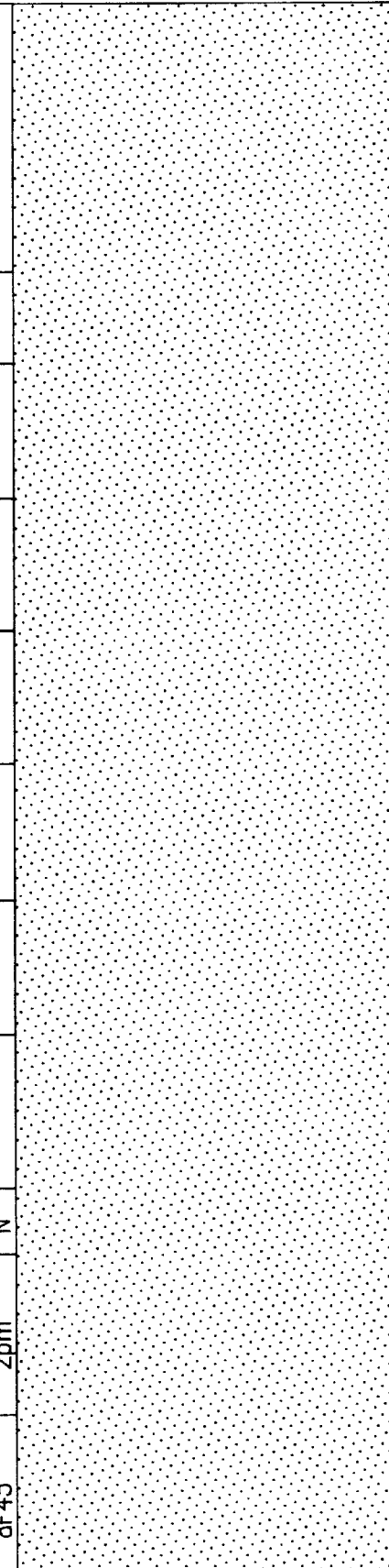
FIG. 8 is a table showing a portion of a database maintained in the operation of the invention.

FIG. 8 is a table showing a portion of a database maintained in the operation of the invention. The software system contained in the host computer 20 includes a database manager, a database application and several utilities which are callable from the database manager. Since the control of this system is easily handled by a PC, it is recommended that the database manager be a commercial system such as DB4 or Paradox. The application programs can be written in the host DBMS language. Likewise, the procedures for communication from the base station to the labels can also be written in the host DBMS language.

The application DBMS programs are those programs which affect the user and database directly. These programs provide the interface to interact with the database, query for reports, send data to the labels, and so forth. The communication programs are those programs which have no human intervention but deliver messages and detect problems.

The database 160 will consist of a record for each Universal Product Code (UPC) in the store. Each UPC will be matched with a label address 162. This is the label which is being used to display price for the item represented by the UPC. Both the UPC and label addresses are unique. They will be used as keys in the database. Therefore, there is a 1—1 mapping between label address and UPC numbers. It is impossible to have redundant UPC or label addresses entered in the database.

Each UPC/Address pair record 164 will also contain the path used for communication between the host computer 20 and the label(s) 18 for the product represented by the UPC. Additionally, for each UPC/Address pair record 164 there will be a date/time stamp for the last time the home computer 20 has received an acknowledgement signal (ACK) from that label. As shown in FIG. 8, the item having the label address 1FE3 last transmitted an ACK signal at 11:56 pm, it is not "lost", and the path from the host computer 20 to the product's single label 18 is 554C. Further, the item having the label address 7Fe2 last transmitted an ACK signal at 9 am, is not lost, and the three labels 18 for the product have paths 345F, 334C and 45FF.

Figure 9:
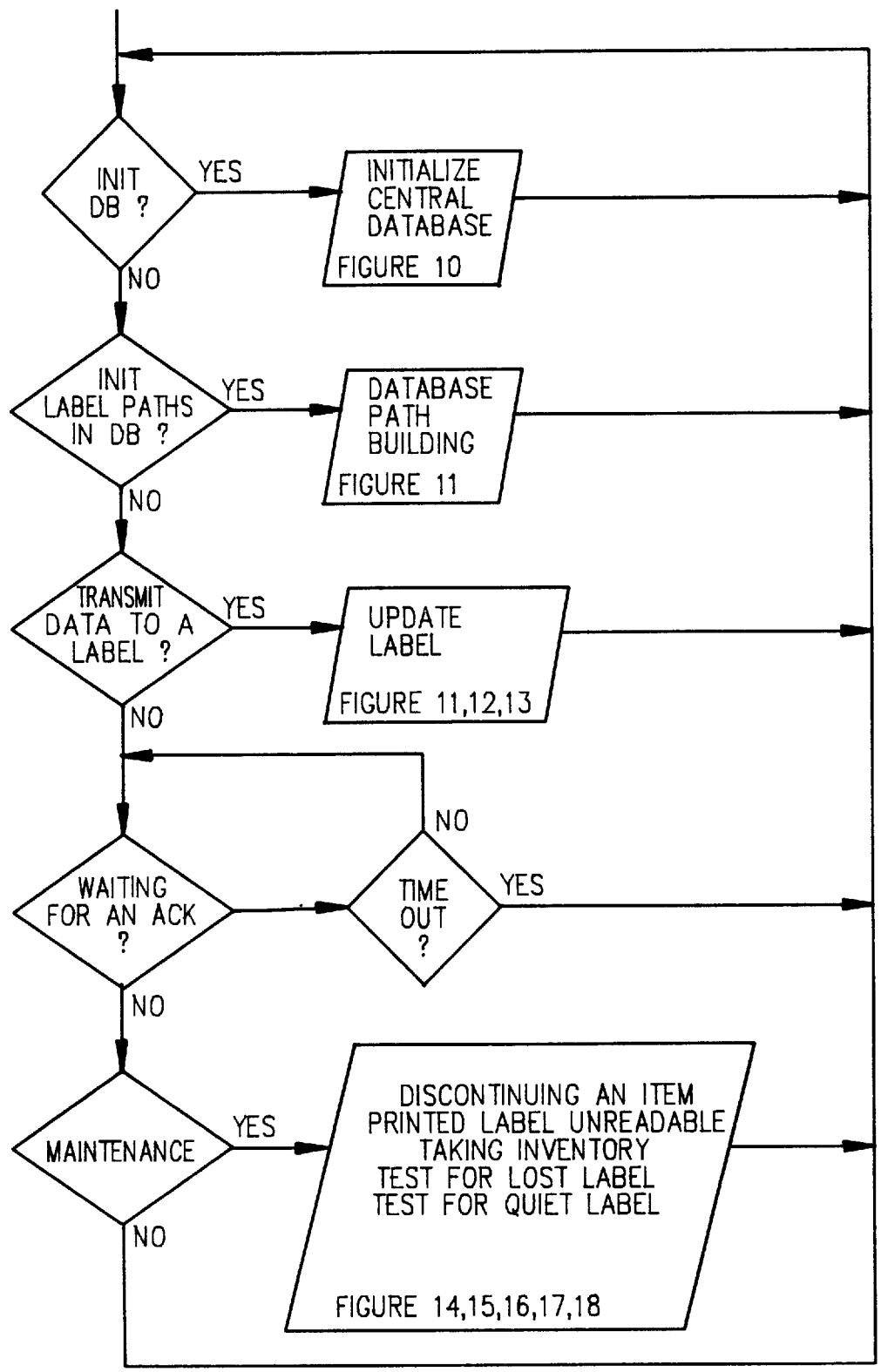
FIG. 9 is a flow chart describing the overall programming of the inventive label location system.

FIG. 9 is a flow chart describing the overall programming of the inventive label location system. Upon first entry into the program, it must be decided whether the database needs to be initialized (box 170). If so, it is (box 172) and control is returned to box 170. If the database does not need to be initialized, next the program determines whether the label paths in the database need to be initialized (box 174). If they do, the paths are built for the database (box 176) and control is returned to box 170. If not, it is next determined whether it is necessary to transmit information (such as data) to a label 18 (box 178). If so, the information is transmitted to update the label 18 (box 180) and the program returns to box 170. If not, the program next determines whether it is waiting for an ACK signal to return from a label 18 (box 182). If so, the program refers to a timer which is started when the information is transmitted in box 180 (box 184). The timer can be maintained by the software of the system. If the timer has exceeded a predetermined time limit, then control is returned to box 170. Otherwise, the program loops between boxes 182 and 184 until the timer exceeds the predetermined time limit. If the program is not waiting for an ACK signal, it determines whether there are any maintenance tasks to be performed (box 186). If there are no maintenance tasks, the program returns to box 170, to initialize the database. Otherwise, the program determines which maintenance task is required, performs the needed tasks (box 188) and then returns to box 170.

Figure 10:
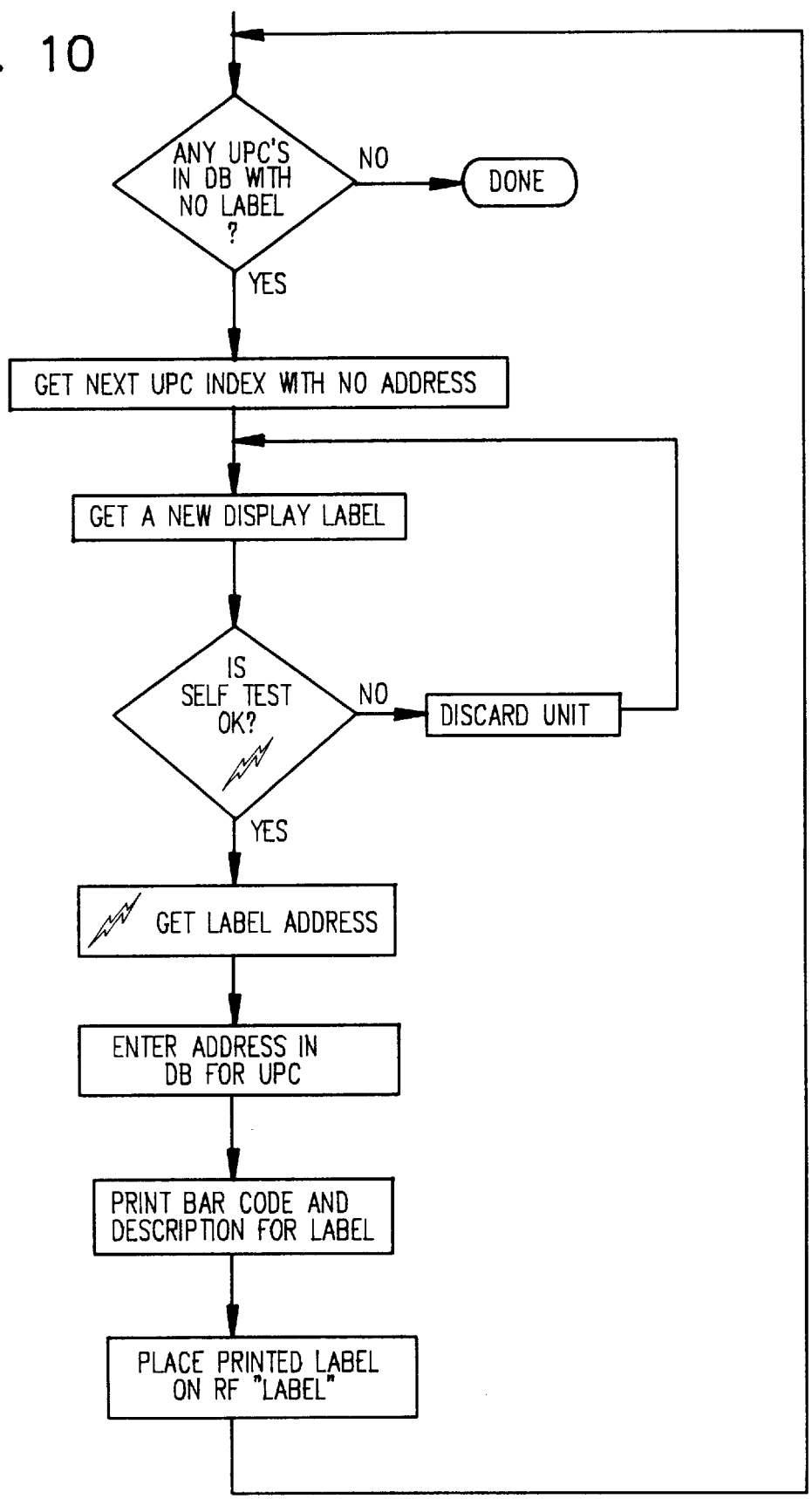
FIG. 10 is a flow chart describing the initialization the database maintained in the operation of the invention.

FIG. 10 is a flow chart describing the initialization the database maintained in the operation of the invention. This procedure is indicated by box 172 in FIG. 9. Initially the database is a set of UPC numbers. Then the UPC numbers are matched up with their respective label address and each is fitted with a bar code/human readable label. Referring to the flow chart in FIG. 10, the program first determines whether there are any UPC in the database with no label (box 190). If there are none, the database initialization procedure is finished and control returns to box 170 in FIG. 9 (box 192). If there are UPCs with no labels 18, the program determines the next UPC index which has not been assigned an address (box 194) and then prompts a user to get a new display label 18 for use with the UPC index (box 196). The user then causes the label to perform a self-test. The user then informs the program of the results of the self-test (box 198). If the self-test is not performed satisfactorily, the user so informs the program, which instructs the user to discard the chosen label 18 (box 200) and returns to box 196. If the self-test is performed satisfactorily, the program electronically prompts the selected label 18 to transmit its preprogrammed address to the host computer 20 (box 202), enters the received address in the database for the selected UPC index (box 204), causes a bar code and description of the item to be printed on an adhesive piece of paper to be applied to the label 18 (box 206), and then prompts the user to apply the printed adhesive paper to the label 18 (box 208). After this, the program returns to box 190 to determine whether there are any more UPCs in the database that have no labels. Those skilled in the art will recognize that the process represented by box 198, 200 and 202 and the step represents by the box 208 can be automated, so that no human user is necessary.

Figure 11:
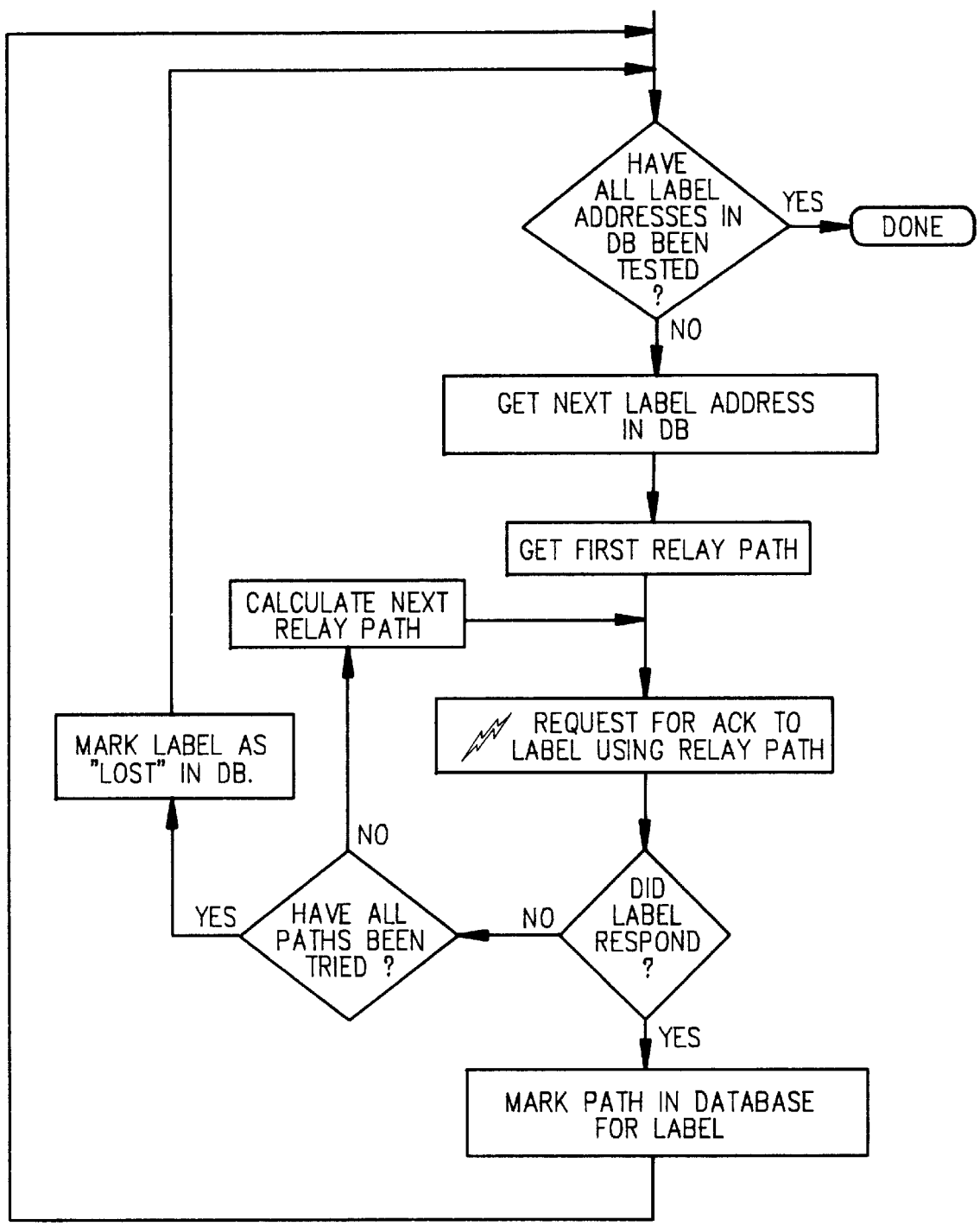
FIG. 11 is a flow chart describing the building of a path in the database maintained in the operation of the invention.

FIG. 11 is a flow chart describing the building of a path in the database maintained in the operation of the invention. This procedure is indicated by box 176 in FIG. 9. The procedure assumes that the database is initialized and the labels 18 are placed on the gondolas 12, and then finds the first path (regardless of length) which connects the host computer 20 to the label 18, possibly through a sequence of relays 22. The program starts by determining whether all label addresses in the database have been tested (box 210).

If they have, this task is completed and control of the program returns to box 170 in FIG. 9 (box 212). Otherwise, the program obtains the next label address available in the database (box 214), establishes the first relay path (numbered according to some predetermined procedure) (box 216) and electronically transmits an ACK signal to the label address obtained in box 214 (box 218) along the selected path. The program then determines whether the label 18 corresponding to the transmitted address responds (box 220). If so, the program modifies the database to associate the path with the label 18 (box 222). Otherwise, the program determines whether all of the possible paths, selected in accordance with the predetermined path numbering procedure mentioned above, have been tried (box 224). If the paths have not all been tried, the program obtains the next relay path in accordance with their numbering scheme (box 226) and returns to the program step represented by the box 218. If all of the paths have been tried, the label 18 is marked as "lost" in the database (box 228) and the program returns to the box 210.

Figure 12:
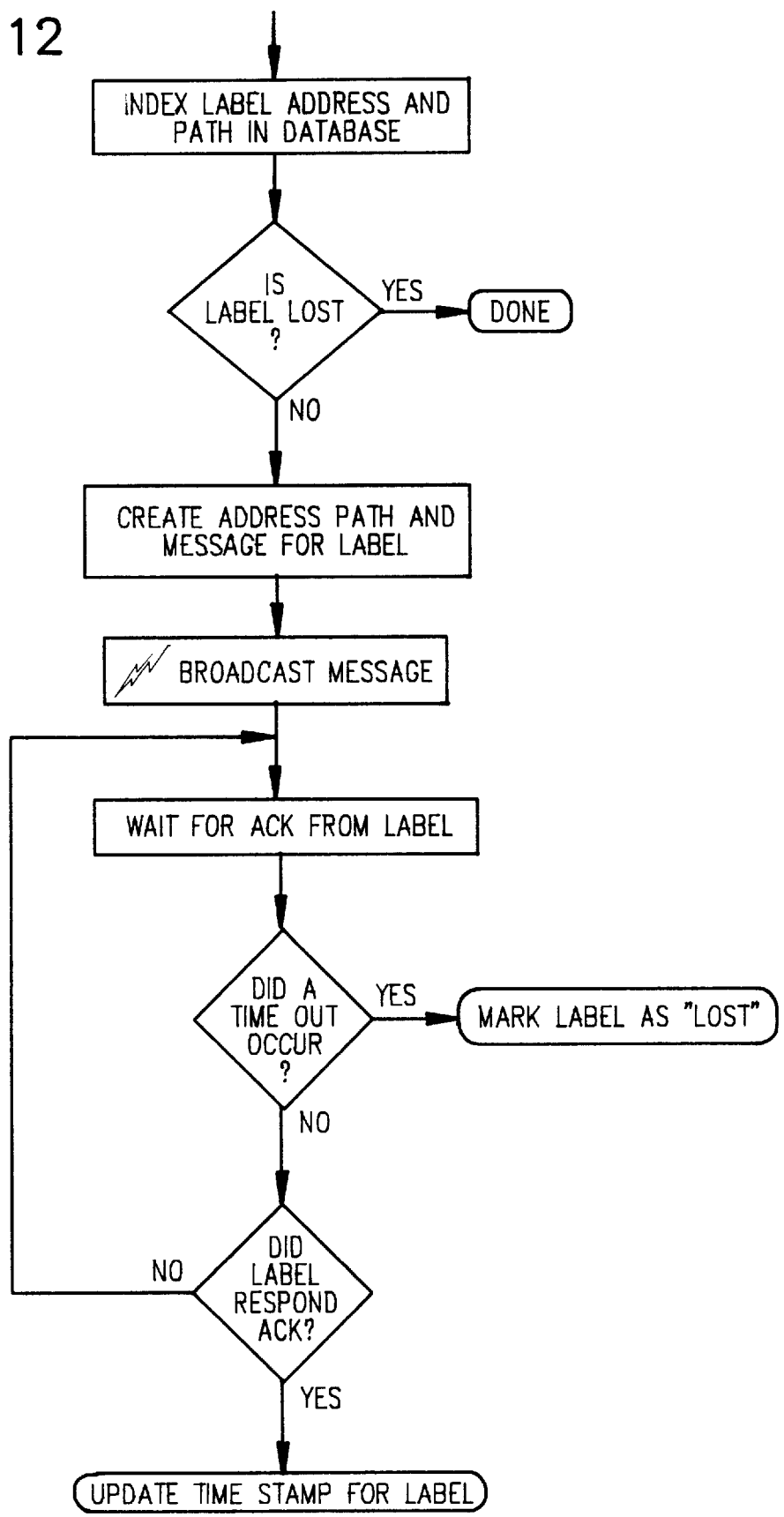
FIG. 12 is a flow chart describing the updating of a specific label with a specific message.

FIG. 12 is a flow chart describing the updating of a specific label with a specific message. This procedure is indicated by box 180 in FIG. 9. This procedure is the basic process by which the host computer 20 communicates with a label 18. It is used frequently for updating prices, and so forth. The program first indexes the label address and path in the database (box 230). Next, the database is referred to in order to establish whether the label 18 is lost (box 232). If it is, the procedure is completed (box 234) and the program returns to box 170 in FIG. 9. Otherwise, the program creates an address path and message containing information to be sent to the label 18 (box 236). Next, the message is transmitted (box 238) and the program waits for an ACK signal from the label 18. (block 240). If the time since the message was transmitted exceeds a predetermined time limit (box 242), the label 18 is marked as "lost" in the database (box 244) and the program returns to box 170 in FIG. 9. If the label 18 has not responded to the transmission of the message by the retransmission of an ACK signal (box 246), the program returns to box 240. On the other hand, if the label 18 did respond with an ACK signal to the host computer 20, the database is updated with storage of the time of receipt of the ACK signal and control of the program is returned to box 170 in FIG. 9 (box 248).

Figure 13:
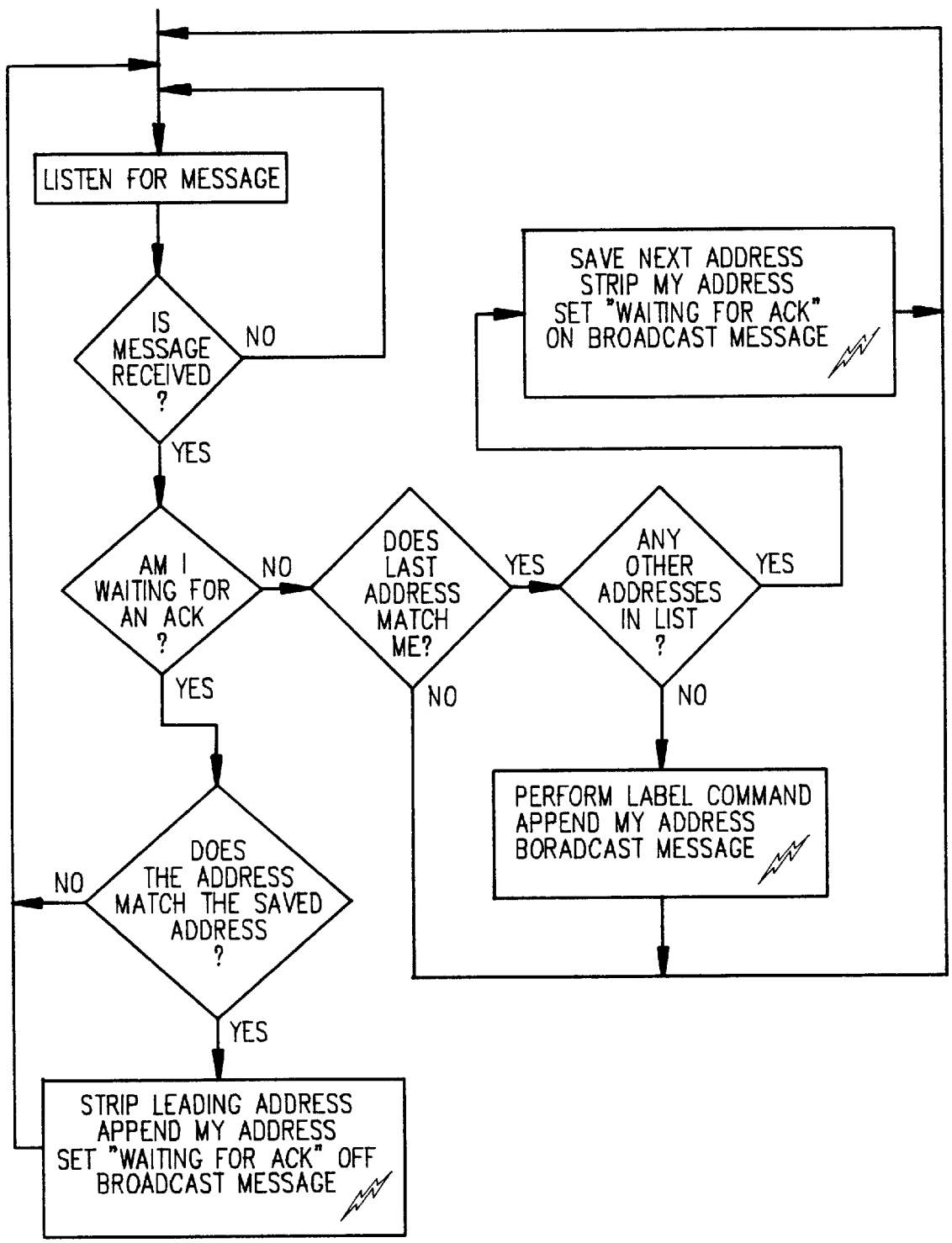
FIG. 13 is a flow chart describing the relay-to-relay transmission of a message to update a label.

FIG. 13 is a flow chart describing the relay-to-relay transmission of a message to update a label. This procedure is indicated as part of the procedure indicated by box 180 in FIG. 9. It is the program run by each intermediate relay 22 in the path chosen to transmit a message from the host computer 20 to a label 18. In the first step in the procedure, the relay 22 listens for a message (box 250) and then tests to determine whether a message was received (box 252). If no message was received, the program returns to box 250. Otherwise, the program in the relay 22 determines whether the relay 22 is waiting to receive an ACK signal (box 254). If the relay 22 is waiting for an ACK signal, this means that the relay 22 has already transferred a message intended for a label 18 and is waiting for an ACK signal from the particular relay 22 or label 18 to which the current relay 22 transferred the message. The relay 22 has stored the address of the particular relay 22 or label 18. This ACK signal will confirm that the label 18 received the message. If the relay 22 is waiting for an ACK signal, the program determines whether the address associated with the ACK signal matches the stored address (box 256). If not, the ACK signal was intended for another relay 22 or label 18, so program control returns to box 250 to listen for more messages. If the two addresses are the same, the program strips the leading address from the ACK signal, appends its own address, disables the flag in the relay 22 which indicates that the relay 22 is waiting for an ACK signal, transmits the revised ACK signal, and then returns to box 250 (box 258). If the flag which indicates that the relay 22 is waiting for an ACK signal is turned off, the relay 22 determines whether the "last" address in the message matches the relay's own address (box 260). If there is no match, the program returns to box 250 of the program. If there is a match, the relay 22 determines whether there are any other addresses in the message (box 262). If there are no more addresses, the relay 22 operates in accordance with the information in the message. If the information is data, the data are stored, for example. If the information is a command, the relay 22 performs the command. Next the relay 22 appends its address to an ACK signal and transmits the augmented ACK signal (box 264). If the program determines that there are other addresses in the message that the relay 22 has received, the program strips off the "last" address from the message, saves the next address in its memory, sets its "waiting for ACK" flag, broadcasts the revised ACK signal, and returns to box 250 (box 266).

Figure 14:
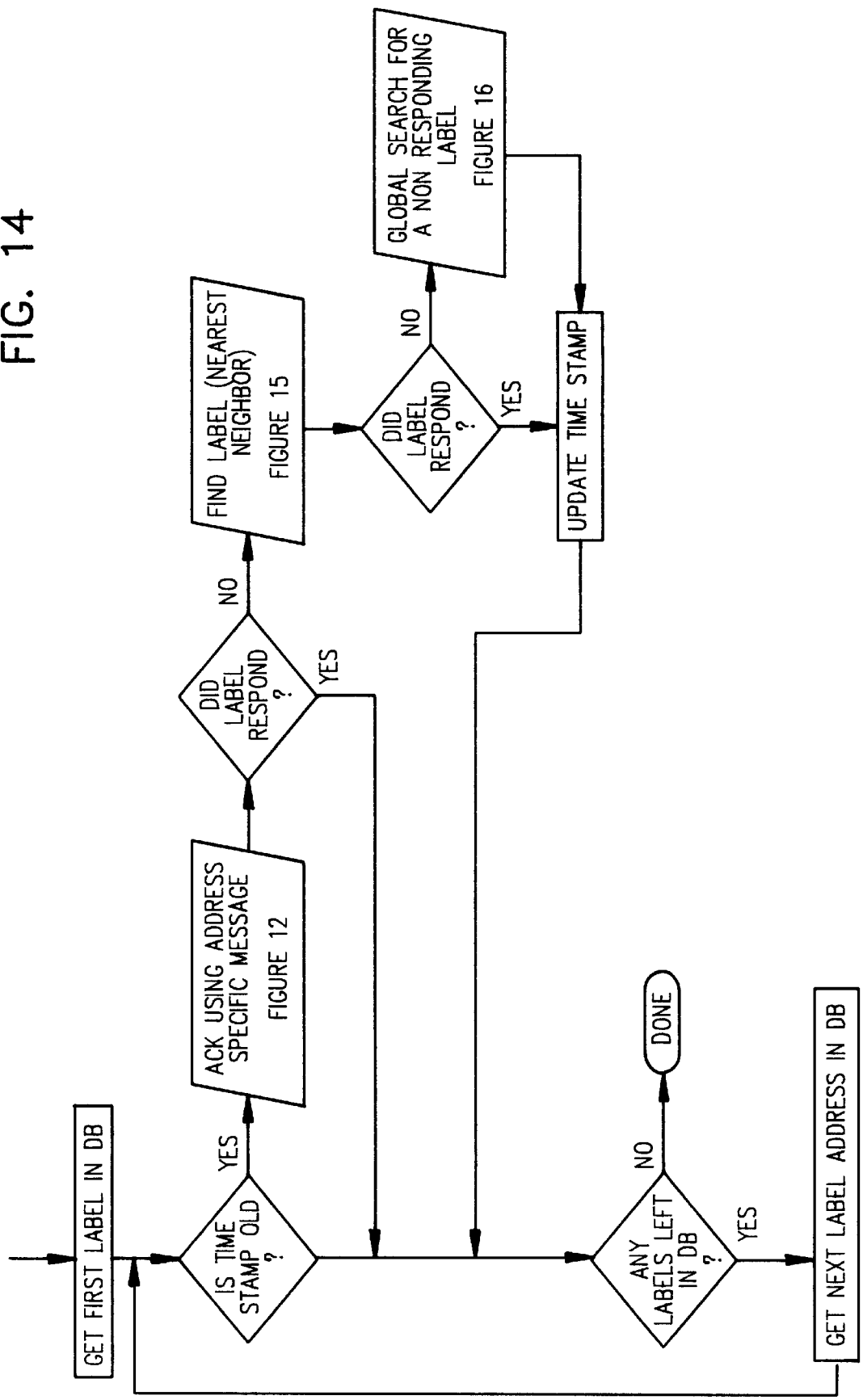
FIG. 14 is a flow chart describing the test for quiet labels.

FIG. 14 is a flow chart describing the test for quiet labels. This procedure is indicated as part of the procedure indicated by box 188 in FIG. 9. The procedure gets the first entry in the database corresponding to the first label (box 270). Next, the procedure tests the time stamp stored in the database to determine whether the time stamp is old (box 272). If the time stamp is not old, the program determines whether there are any more labels left in the database (box 274). If not, the program exits (box 276) to return to box 170 of FIG. 9. If there are more labels left in the database, the program gets the entry corresponding to the next label (box 278) and returns to box 272). If the time stamp is not old, the program causes the host computer 20 to transmit an ACK signal to the label 18 corresponding to the current entry (box 280, comprising a search among the nearest neighbors of the label 18). This process is shown in greater detail in FIG. 12. If the label 18 responds with an ACK signal (box 282), the program returns to box 274. Otherwise, the procedure locates the label 18 (which is now determined to be "lost") (box 284). This process is shown in greater detail in FIG. 15. If the label 18 responds to the procedure in box 284 (box 286), the time stamp is updated (box 288) and the program returns to box 274 (box 288). If the label 18 does not respond to the nearest neighbor search, a global (exhaustive) search for the label 18 is performed (box 290), after which the program returns to box 288. The global search is shown in greater detail in FIG. 16.

Figure 15:
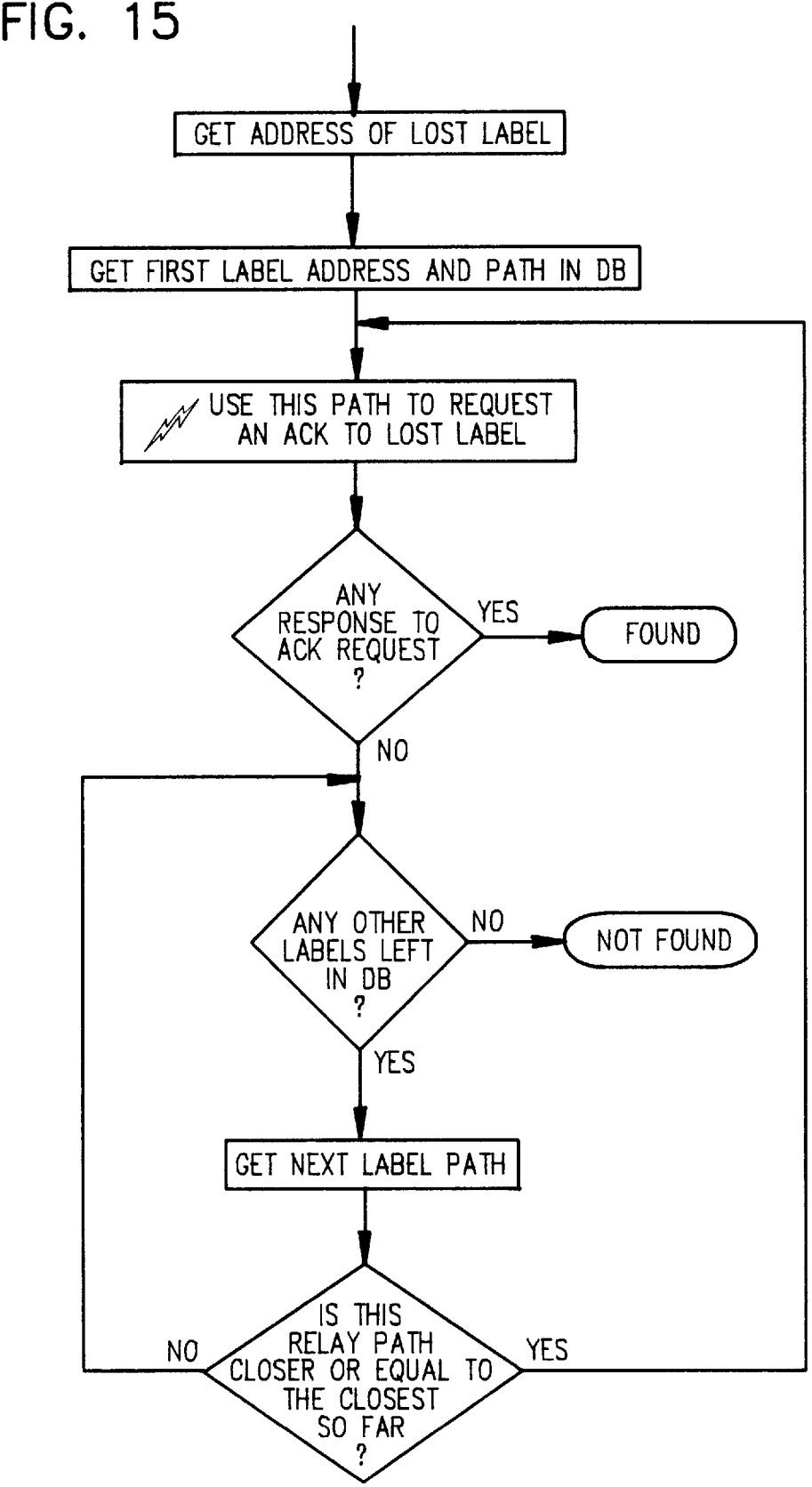
FIG. 15 is a flow chart describing a nearest neighbor method of finding a lost label.

FIG. 15 is a flow chart describing a nearest neighbor method of finding a lost label. This procedure is indicated as part of the procedure indicated by box 284 in FIG. 14. This procedure is used as a first pass in determining the location of a lost or quiet label 18. The basic principle is to look for the label 18 in the areas close to its original position (nearest neighbors). Labels 18 can get inadvertently covered by store items which block transmissions. This procedure uses other similar paths to attempt to communicate with the label, through the use of nearby labels 18 as relays 22. Since the procedure will try to communicate using labels 18 as relays 22 having the same path as the lost label 18, the procedure also needs to calculate the location of relays with respect to each other, in order to compute "closeness." The procedure first obtains the address of the lost label 18 from the database (box 292) and gets the first label address and path in the database (box 294). The program then uses the path just obtained to transmit an ACK signal to the lost label through the label whose address was just obtained from the database (box 296). The program next tests to determine whether there is any response to the transmission of the ACK signal (box 298). If there is, the "lost" label has now been found, and a new path to that label 18 established so the program returns to box 186 of FIG. 14 (box 300). If there is no response to the ACK signal, the program determines whether there are any further labels left in the database (box 302). If there are not, the lost label 18 is still lost, and the program returns to box 286 of FIG. 14 (box 304). If there are more labels left in the database, the program obtains the next label path (box 306) and then checks to determine whether this path is closer or equal to the closest path tested so far (box 308). If this path is closer or equal to the closest so far, the program returns to box 296. Otherwise, the program returns to box 302.

Figure 16:
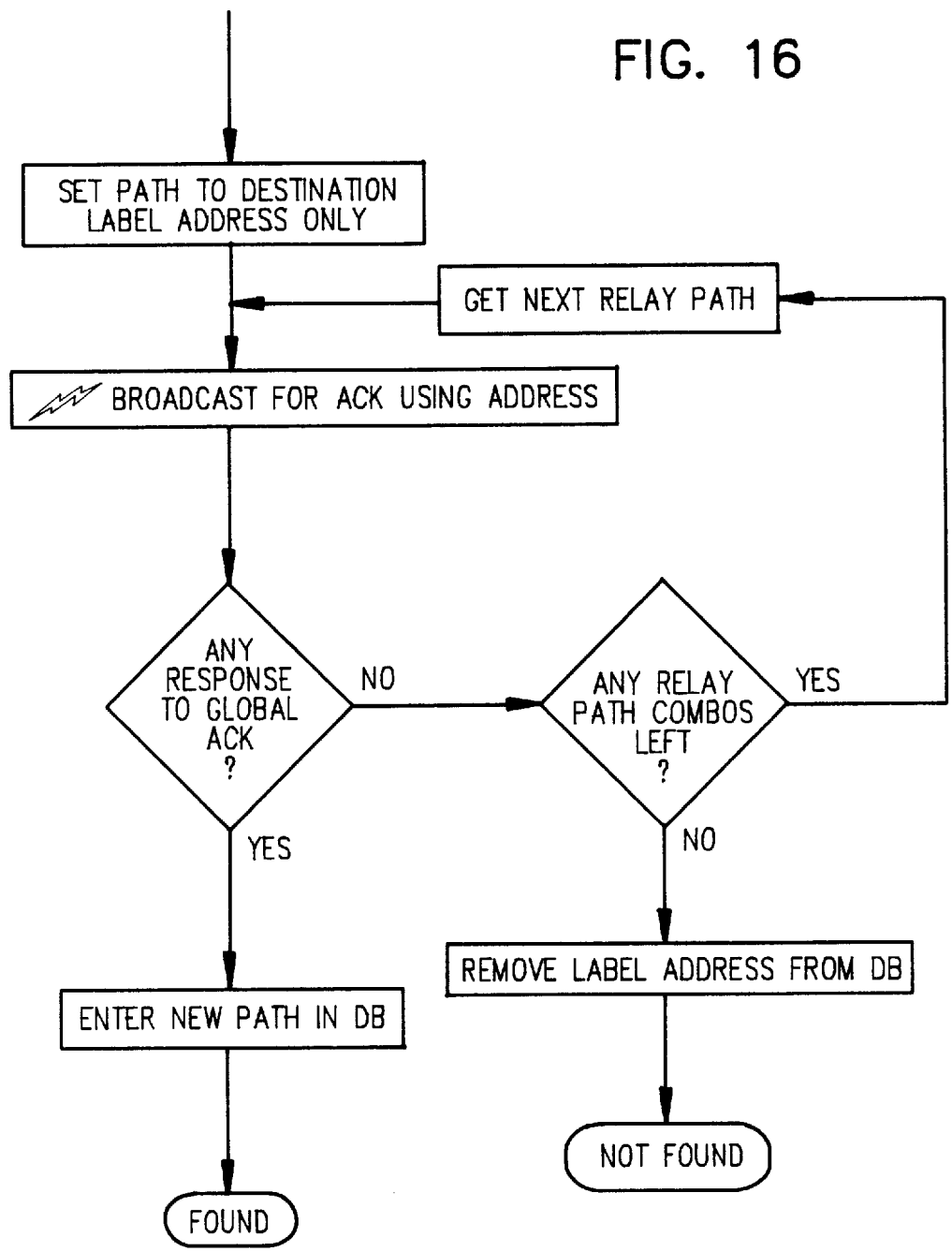
FIG. 16 is a flow chart describing an exhaustive method of finding a lost label.

FIG. 16 is a flow chart describing an exhaustive method of finding a lost label. This procedure is indicated as part of the procedure indicated by box 290 in FIG. 14. This procedure is used to find any labels 18 in the database which are marked "lost". The general principle is to try to find this label 18 using all available relay paths, all combinations of relay paths, and all combinations of relay paths using labels and relays. This procedure is used as a last resort to determine if the label is no longer working, repositioned in the store, or removed from the store. The procedure sets the path to the destination label address only (box 310). Next, the program broadcasts for an ACK signal, using the address (box 312) and tests for any response (box 314). If there is a response, the lost label 18 has been found, so the new path is entered in the database (box 316) and the program returns to box 288 (box 318). If there is no response to the global ACK signal, the program tests to learn whether there are any relay path combinations left (box 320). If there aren't, the lost label 18 has not been found, so the address of the lost label is removed from the database (box 322) and the program returns to box 274 in FIG. 14 (box 324). If there are relay path combinations left, the program gets the next relay path (box 326) and returns to box 312.

Figure 17:
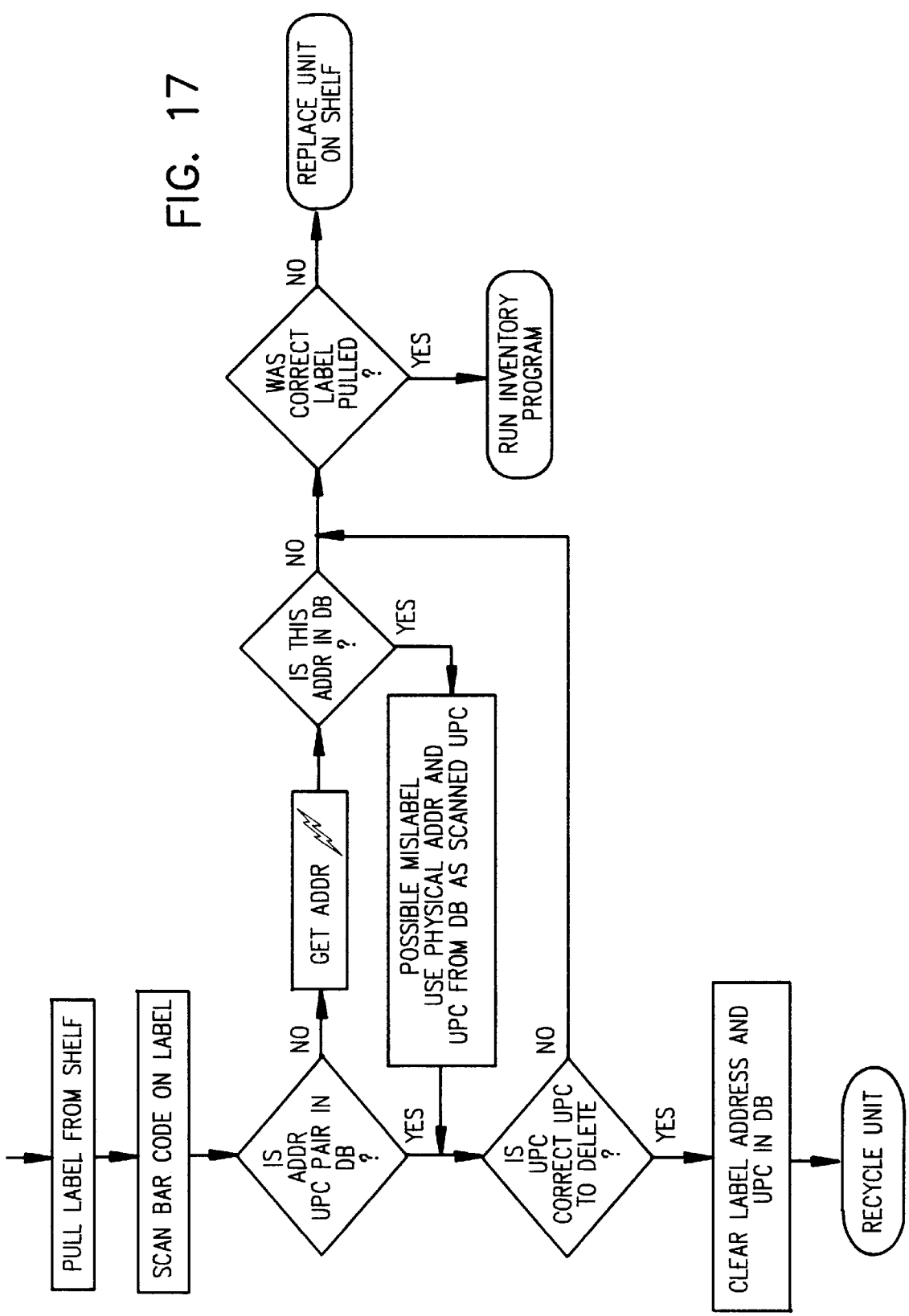
FIG. 17 is a flow chart describing the process of discontinuing a shelf item.

FIG. 17 is a flow chart describing the process of discontinuing a shelf item. This procedure is indicated as part of the procedure in box 188 in FIG. 9. In this procedure the label 18 is removed from the shelf of a gondola 12 (box 326) and the bar code on the label 18 is scanned (box 327). Next, the database is accessed to determine whether the address/UPC pair corresponding to the label 18 is stored in the database (box 328). If the address/UPC pair is not stored in the database, the address is retrieved electronically from the label 18, using the scanner (box 329). Next, the address that has been read electronically is checked against the database (box 330). If this address is not in the database either, the label 18 is checked to see whether it is the correct label 18 (box 331). If the correct label 18 was not pulled, this label is replaced on the shelf from which it was taken (box 332) and program returns to box 326. Otherwise, the inventory program is run (box 333).

If the new address is found in the database in box 330, there is a possible mislabelling problem and the physical address and the UPC from the database are used to describe the pulled label 18 (box 334).

Figure 18:
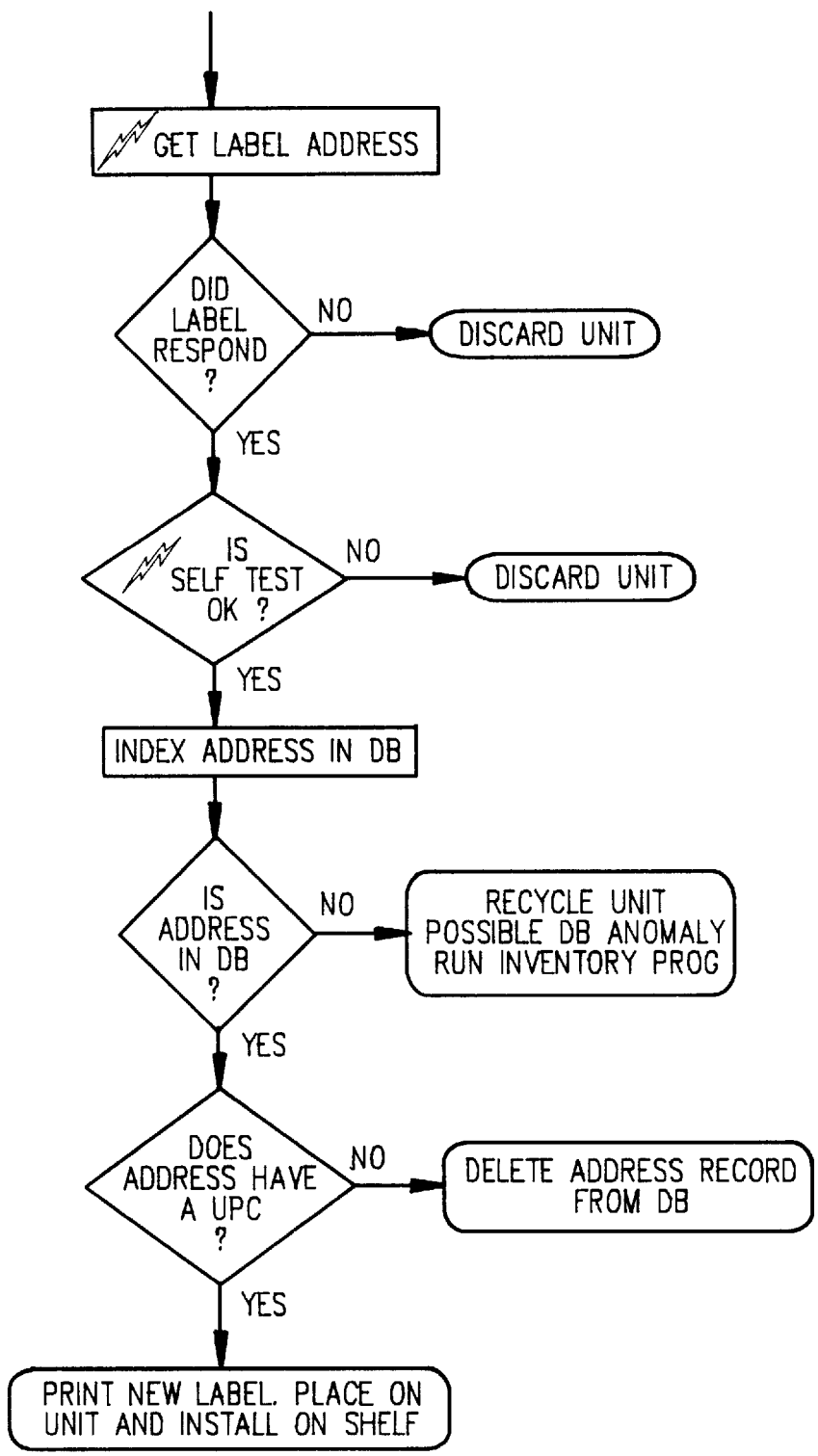
FIG. 18 is a flow chart describing the process of verifying the placement of a label.

If the address/UPC pair was found in the database in box 328, or if the possible mislabel problem is determined in box 334, next the program enters the box 335 to determine whether the UPC is the correct UPC to delete. If it is not the correct UPC to delete, the program returns to box 331. Otherwise, the program clears the label address and UPC in the database (box 336), the label unit is recycled (box 337), and the program continues from box 188 in FIG. 9, FIG. 18 is a flow chart describing the process of verifying the placement of a label. This procedure is indicated as part of the procedure in box 188 in FIG. 9. It is used to verify the placement of a label which is inadvertently removed from its shelf or whose printed label is unreadable. This procedure first electronically prompts the label 18 to transmit its address (box 342) and tests to determine whether the label 18 responds (box 344). If the label does not respond, it is broken and discarded, and the program returns to box 188 of FIG. 9 (box 346). If the label 18 responds, the program causes the label 18 to perform a self-test (box 348). If the self-test is not satisfactory, the label 18 is discarded (box 350) and the program returns to box 188 of FIG. 9. If the self-test is satisfactory, the label address is indexed in the database (box 352) and the address of the label 18 is checked to determine if it is stored in the database (box 354). If the address is not in the database, one of three conditions must be true (box 356): 1) the unit can be recycled, 2) there is a possible database anomaly, or 3) the inventory program should be run. In the first case, the program returns to box 170 of FIG. 9. In the third case, the program transfers to the inventory program shown in FIG. 19. If the address is found in the database, the database is checked to determine whether the address has an associated UPC (box 358). If there is no UPC associated with the label address, the address record is deleted from the database (box 360) and the program returns to box 170 of FIG. 9. If the address does have an associated UPC, a new label is printed, placed on the label 18, the label 18 is installed on the appropriate shelf, and the program transfers to box 170 of FIG. 9 (box 362).

Figure 19:
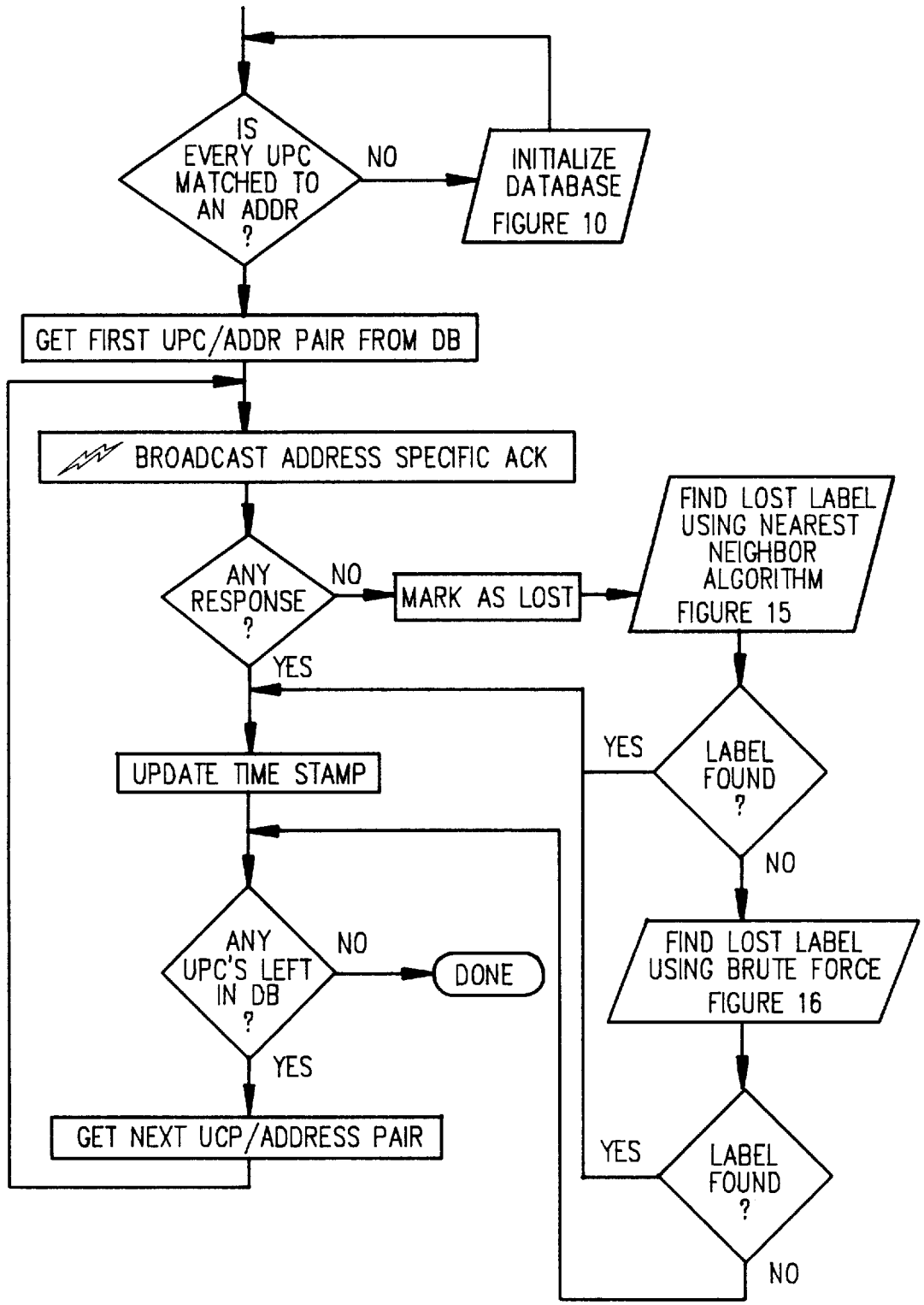
FIG. 19 is a flow chart describing the process of periodically checking all labels.

FIG. 19 is a flow chart describing the process of periodically checking all labels. This procedure is indicated as part of the procedure in box 188 in FIG. 9. This procedure is useful for periodically checking all labels 18 in the system to determine if any are not working, box ed from transmission or removed from the store. The procedure first tests to determine whether every UPC is matched to an address (box 364). If this is not the case, the database is initialized according to the procedure of FIG. 10 (box 366). Otherwise, the program gets the first UPC/address pair from the database (box 368) and causes the transmitter 22 to broadcast an ACK signal to that specific address (box 370). The procedure then checks to determine if there is any response to the ACK signal (box 372).

If there is a response, the time stamp is updated (box 374) and the database is check to determine if there are any UPCs left (box 376). If there are no UPC left in the database, the procedure is complete and the program returns to box 170 in FIG. 9 (box 170). If there are more UPCs left in the database, the procedure gets the next UPC/address pair (box 380) and returns to box 370.

If there is no response, the label 18 is marked as lost in the database (box 382) and then the nearest neighbor procedure of FIG. 15 is applied (box 384). The results of the nearest neighbor procedure are determined in box 386. If the nearest neighbor procedure successfully locates the label, the procedure transfers to box 374. Otherwise, the procedure uses the exhaustive procedure of FIG. 16 to try to locate the lost label 18 (box 388). The results of the exhaustive procedure are determined in box 390. If the label 18 is located by the exhaustive procedure, the program transfers to box 374. Otherwise the program transfers to box 376.

The preferred embodiment of the present invention has been described in detail sufficient for one skilled in the electronics and radio frequency arts to understand the invention. Such skilled persons, however, could devise alternative embodiments to that described herein while remaining within the scope of the appended claims. Accordingly, the scope of the invention is to be limited only by the appended claims.

I claim:

1. In a wireless product label identification system comprising a host transceiver and a plurality of individually addressed product labels having transceivers, the transceivers being capable of transmitting and receiving radio frequency (RF) electromagnetic signals, wherein at least some of the individually addressed product labels serve as relays between 1) the host transceiver or one of the individually addressed product labels and 2) another of the individually addressed product labels, a method for communicating information to the product label having a specific address, the method comprising the steps of:

a) determining a path through the plurality of individually addressed product labels, from the host transceiver to the product label having the specific address, along which the information can be communicated;

b) generating a message representing the path and the information to be communicated; and c) transmitting the message as an RF electromagnetic signal to the product label having the specific address.

2. The method of claim 1 wherein step c) includes causing each of the plurality of individually addressed product labels along the path to process the message it receives by removing its address from the message and retransmitting the processed message to the next individually addressed product label along the path.

3. The method of claim 2 wherein each individually addressed product label along the path transmits an acknowledgement signal to the host transceiver after it retransmits the processed message to the next individually addressed product label along the path.

4. In a wireless product label identification system comprising a host transceiver and a plurality of individually addressed product labels having transceivers, the transceivers being capable of transmitting and receiving radio frequency (RF) electromagnetic signals, wherein at least some of the individually addressed product labels serve as relays between 1) the host transceiver or one of the individually addressed product labels and 2) another of the individually addressed product labels, an apparatus for communicating information to the product label having a specific address, the apparatus comprising:

a first circuit connected to the host transceiver to determine a path through the plurality of individually addressed product labels, from the host transceiver to the product label having the specific address, along which the information can be communicated;

a second circuit connected to the first circuit to generate a message representing the path and the information to be communicated; and a transmitter driver circuit connected to the first circuit to cause the message to be transmitted as an RF electromagnetic signal to the product label having the specific address.

5. The apparatus of claim 4, further comprising a fourth circuit contained within each of the plurality of individually addressed product labels along the path to process the message it receives by removing its address from the message and retransmitting the processed message to the next individually addressed product label along the path.

6. The apparatus of claim 5, further comprising a fifth circuit contained within each individually addressed product label along the path to transmit an acknowledgement signal to the host transceiver after the individually addressed product label retransmits the processed message to the next individually addressed product label along the path.

7. In a wireless product label identification system comprising a host transceiver and a plurality of individually addressed product labels having transceivers, the transceivers being capable of transmitting and receiving radio frequency (RF) electromagnetic signals, wherein at least some of the individually addressed product labels serve as relays between 1) the host transceiver or one of the individually addressed product labels and 2) another of the individually addressed product labels, a method for causing those of the product labels that satisfy a predetermined criterion to communicate with the host transceiver, the method comprising the steps of:

a) transmitting to all of the product labels a message specifying the predetermined criterion, the message being transmitted as an RF electromagnetic signal;

b) causing each of the product labels that receives the message to determine whether it satisfies the criterion; and c) causing those of the product labels that determine that they satisfy the criterion to respond by transmitting a predetermined message back to the host transceiver, the predetermined message being transmitted as an RF electromagnetic signal.

8. The method of claim 7 wherein each of the product labels is an individually addressed product label and step c) further includes causing the predetermined message to include the address of the product label that transmits the predetermined message.

9. The method of claim 7 wherein the predetermined message includes an acknowledgement signal.

10. In a wireless product label identification system comprising a host transceiver and a plurality of individually addressed product labels having transceivers, the transceivers being capable of transmitting and receiving radio frequency (RF) electromagnetic signals, wherein at least some of the individually addressed product labels serve as relays between 1) the host transceiver or one of the individually addressed product labels and 2) another of the individually addressed product labels, an apparatus for causing those of the product labels that satisfy a predetermined criterion to communicate with the host transceiver, the apparatus comprising:

a transmitter to transmit to all of the product labels a message specifying the predetermined criterion, the message being transmitted as an RF electromagnetic signal;

a message processing circuit within each of the product labels to cause each of the product labels that receives the message to determine whether the product label satisfies the criterion; and a plurality of transmitter driver circuits, one transmitter driver circuit being contained within each of the product labels, to cause those of the product labels that determine that they satisfy the criterion to respond by transmitting a predetermined message back to the host transceiver, the predetermined message being transmitted as an RF electromagnetic signal.

11. The apparatus of claim 10 wherein each of the product labels is an individually addressed product label and the apparatus further comprises an addressing circuit in each of the product labels to cause the predetermined message to include the address of the product label that transmits the predetermined message.

12. The apparatus of claim 10, further comprising a signal generator circuit in each product label to cause the predetermined message to include an acknowledgement signal.

13. In a wireless product label identification system comprising a host transceiver and a plurality of individually addressed product labels, the host transceiver being capable of transmitting and receiving radio frequency (RF) electromagnetic signals, wherein at least some of the individually addressed product labels serve as relays between 1) the host transceiver or one of the individually addressed product labels and 2) another of the individually addressed product labels, a method for determining which of the product labels has become lost in a last predetermined period of time, the method comprising the steps of:

a) determining which of the product labels has not communicated with the host transceiver in the last predetermined period of time;

b) causing the host transceiver to sequentially transmit a message as an RF electromagnetic signal addressed to each of the product labels that have not communicated with the host transceiver in the last predetermined period of time, the message being structured to cause the product label to respond to the host transceiver with a predetermined reply message if the product label receives the message; and c) determining which of the product labels replies to the host transceiver with the predetermined reply message in response to the message transmitted to the product labels, thereby identifying those addressed product labels which did not reply as having become lost in the last predetermined period of time.

14. The method of claim 13 wherein at least one of the individually addressed product labels is a repeater and step b) includes establishing a path to a product label that has not communicated with the host transceiver in the last predetermined period of time.

15. The method of claim 14, further comprising the step of:

d) specifying another path to a product label that has not communicated with the host transceiver in the last predetermined period of time if a previously specified path to the product label did not result in a response from the product label and then returning to step c), until all paths to the product label have been tried.

16. In a wireless product label identification system comprising a host transceiver and a plurality of individually addressed product labels, the host transceiver being capable of transmitting and receiving radio frequency (RF) electromagnetic signals, wherein at least some of the individually addressed product labels serve as relays between 1) the host transceiver or one of the individually addressed product labels and 2) another of the individually addressed product labels, an apparatus for determining which of the product labels has become lost in a last predetermined period of time, the apparatus comprising:

a first processing circuit to determine which of the product labels has not communicated with the host transceiver in the last predetermined period of time;

a transmitter control circuit to cause the host transceiver to sequentially transmit an RF electromagnetic signal containing a message addressed to each of the product labels that have not communicated with the host transceiver in the last predetermined period of time, the message being transmitted as an RF electromagnetic signal structured to cause the product label to respond to the host transceiver with a predetermined reply message if the product label receives the message; and a second processing circuit to determine which of the product labels replies to the host transceiver with the predetermined reply message in response to the message transmitted to the product labels, thereby identifying those addressed product labels which did not reply as having become lost in the last predetermined period of time.

17. The apparatus of claim 16 wherein at least one of the individually addressed product labels is a repeater and the transmitter control circuit includes a path generator circuit to establish a path to a product label that has not communicated with the host transceiver in the last predetermined period of time.

18. The apparatus of claim 17 wherein the path generator circuit specifies another path to a product label that has not communicated with the host transceiver in the last predetermined period of time if a previously specified path to the product label did not result in a response from the product label until the specified path results in a response from the product label or until all paths to the product label have been tried.

19. A method for providing communications between a host computer and any of a plurality of product labels, the host computer being capable of transmitting and receiving radio frequency (RF) electromagnetic signals, wherein at least some of the individually addressed product labels serve as relays between 1) the host transceiver or one of the individually addressed product labels and 2) another of the individually addressed product labels, the method comprising the steps of:

a) initializing a database in the host computer, the database containing an address for each of the product labels and, for each product label, a sequence of relays between the host computer and the product label, the sequence of relays defining a communication path between the host computer and the product label;

b) determining whether to communicate data between the host computer and a particular product label;

c) testing the database to determine whether there has been a lack of communications between the host computer and any of the product labels for more than a predetermined period of time;

d) sequentially transmitting an RF electromagnetic signal containing a message from the host computer to each of the labels for which these has been a lack of communications with the host computer for more than a predetermined period of time;

e) based on the response to the message, specifying whether each of the product labels for which there has been a lack of communications with the host computer for more than the predetermined period of time is quiet or lost;

f) determining which of the product labels for which there has been a lack of communications with the host computer for more than the predetermined period of time is quiet and which is lost;

g) sequentially transmitting additional communications to each of the lost labels; and h) respecifying any of the product labels from which responses are heard as quiet and the sequence of relays between the host computer and the respecified product label.

20. An apparatus for providing communications between a host computer and any of a plurality of product labels, the host computer being capable of transmitting and receiving radio frequency (RF) electromagnetic signals, wherein at least some of the individually addressed product labels serve as relays between 1) the host transceiver or one of the individually addressed product labels and 2) another of the individually addressed product labels, the apparatus comprising:

- a first circuit in the host computer to initialize a database in the host computer, the database containing an address for each of the product labels and, for each product label, a sequence of relays between the host computer and the product label, the sequence of relays defining a communication path between the host computer and the product label;
- a second circuit in the host computer to determine whether to communicate data between the host computer and a particular product label;
- a third circuit in the host computer to test the database to determine whether there has been a lack of communications between the host computer and any of the product labels for more than a predetermined period of time;
- a transmitter circuit controlled by the host computer to sequentially transmit an RF electromagnetic signal containing a message from the host computer to each of the labels for which these has been a lack of communications with the host computer for more than a predetermined period of time;
- a receiver circuit connected to the host computer to receive any response to the transmitted message;
- a fourth circuit in the host computer to specify whether each of the product labels for which there has been a lack of communications with the host computer for more than the predetermined period of time is quiet or lost;
- a fifth circuit in the host computer to determine which of the product labels for which there has been a lack of communications with the host computer for more than the predetermined period of time is quiet and which is lost;
- a transmitter circuit controlled by the host computer to sequentially transmit additional communications as RF electromagnetic signals to each of the lost labels; and
- a sixth circuit in the host computer to respecify any of the product labels from which responses are heard as quiet and the sequence of relays between the host computer and the respecified product label.

* * * * *